(12) United States Patent
Claessens et al.

(10) Patent No.: US 12,210,203 B2
(45) Date of Patent: Jan. 28, 2025

(54) TRAY HINGE INTERFACE SYSTEM WITH OPPOSING RECESSED SURFACES RECESSED TOWARD THE PIVOT AXIS

(71) Applicant: COMMSCOPE TECHNOLOGIES LLC, Hickory, NC (US)

(72) Inventors: Bart Mattie Claessens, Hasselt (BE); El Moïz Mohammed Michel Ghammam, Brussels (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 339 days.

(21) Appl. No.: 17/600,020

(22) PCT Filed: Mar. 27, 2020

(86) PCT No.: PCT/US2020/025363
§ 371 (c)(1),
(2) Date: Sep. 29, 2021

(87) PCT Pub. No.: WO2020/205572
PCT Pub. Date: Oct. 8, 2020

(65) Prior Publication Data
US 2022/0187556 A1    Jun. 16, 2022

Related U.S. Application Data

(60) Provisional application No. 62/876,518, filed on Jul. 19, 2019, provisional application No. 62/876,498, (Continued)

(51) Int. Cl.
*G02B 6/44* (2006.01)
(52) U.S. Cl.
CPC ............................... *G02B 6/4455* (2013.01)

(58) Field of Classification Search
None
See application file for complete search history.

(56) References Cited

U.S. PATENT DOCUMENTS 4,161,017 A    7/1979  Pierce et al.
4,485,524 A   12/1984  Neville
(Continued)

FOREIGN PATENT DOCUMENTS

CA    1288681 C      9/1991
CN   202383330 U     8/2012
(Continued)

OTHER PUBLICATIONS

Extended European Search Report for Application No. 20741349.3 mailed Oct. 17, 2022.
Extended European Search Report for Application No. 20784607.2 mailed Nov. 4, 2022.
International Search Report and Written Opinion for Application No. PCT/US2022/034521 mailed Oct. 17, 2022.
International Search Report and Written Opinion for Application No. PCT/US2022/036364 mailed Oct. 28, 2022.
(Continued)

*Primary Examiner* — Andrew Jordan
(74) *Attorney, Agent, or Firm* — Merchant & Gould P.C.

(57) ABSTRACT

A telecommunications tray assembly includes a groove plate, a telecommunications tray, and a connection arrangement rotatably connecting the tray to the groove plate. The assembly can include a positioning arrangement enabling the telecommunications tray to be retained in an open position, the positioning arrangement including a positioning member associated with one of the groove plate and the telecommunications tray, wherein the positioning member has an asymmetrical cross-sectional shape. The connection arrangement can include a pair of arms defining apertures receiving a pair of hinge members, wherein the apertures have an elongate cross-sectional shape and the pair of hinge members have a circular cross-sectional shape.

18 Claims, 15 Drawing Sheets

Related U.S. Application Data filed on Jul. 19, 2019, provisional application No. 62/868,113, filed on Jun. 28, 2019, provisional application No. 62/826,697, filed on Mar. 29, 2019.

(56) References Cited

U.S. PATENT DOCUMENTS

| | | | |
|---|---|---|---|
| 4,911,521 A | 3/1990 | Ryuto et al. | |
| 5,074,635 A | 12/1991 | Justice et al. | |
| 5,323,480 A * | 6/1994 | Mullaney | G02B 6/4455 |
| | | | 385/134 |
| 5,407,038 A | 4/1995 | Pedlar | |
| 5,515,472 A * | 5/1996 | Mullaney | G02B 6/4455 |
| | | | 385/136 |
| 5,613,029 A | 3/1997 | Burek et al. | |
| 5,835,657 A | 11/1998 | Suarez et al. | |
| 5,956,449 A | 9/1999 | Otani et al. | |
| 6,009,224 A | 12/1999 | Allen | |
| 6,061,492 A | 5/2000 | Strause et al. | |
| 6,118,868 A | 9/2000 | Daoud | |
| 6,157,715 A | 12/2000 | Daoud | |
| 6,192,180 B1 | 2/2001 | Kim et al. | |
| 6,275,641 B1 | 8/2001 | Daoud | |
| 6,282,285 B1 | 8/2001 | Daoud | |
| 6,292,981 B1 | 9/2001 | Ford et al. | |
| 6,304,707 B1 | 10/2001 | Daems et al. | |
| 6,327,414 B1 | 12/2001 | Strause et al. | |
| 6,385,381 B1 | 5/2002 | Janus et al. | |
| 6,418,266 B1 | 7/2002 | Vitantonio | |
| 6,449,418 B1 | 9/2002 | Brocheton | |
| 6,470,532 B2 | 10/2002 | Rude | |
| 6,661,961 B1 * | 12/2003 | Allen | G02B 6/445 |
| | | | 385/135 |
| 7,418,184 B1 | 8/2008 | Gonzales et al. | |
| 7,509,016 B2 * | 3/2009 | Smith | H04Q 1/142 |
| | | | 385/135 |
| 7,708,138 B2 | 5/2010 | Gelardi et al. | |
| 7,813,612 B2 * | 10/2010 | Smith | H04Q 1/023 |
| | | | 385/135 |
| 7,974,509 B2 * | 7/2011 | Smith | H04Q 1/142 |
| | | | 385/134 |
| 8,086,084 B2 | 12/2011 | Bran de Leon et al. | |
| 8,111,966 B2 | 2/2012 | Holmberg et al. | |
| 8,286,325 B2 | 10/2012 | Cooke et al. | |
| 8,382,657 B1 | 2/2013 | Bodor et al. | |
| 8,428,665 B1 | 4/2013 | McLaughlin et al. | |
| 8,528,956 B1 | 9/2013 | Winiger et al. | |
| 8,549,710 B2 | 10/2013 | Novin | |
| 8,554,044 B2 | 10/2013 | Bran de Leon et al. | |
| 8,732,907 B2 | 5/2014 | Novin | |
| 9,063,316 B2 | 6/2015 | Loeffelholz et al. | |
| 9,494,760 B2 | 11/2016 | Simmons et al. | |
| 9,523,834 B2 | 12/2016 | Kowalczyk et al. | |
| 9,575,279 B1 | 2/2017 | Yoshizawa et al. | |
| 9,653,124 B2 | 5/2017 | Heyd et al. | |
| 9,709,766 B2 | 7/2017 | Claessens et al. | |
| 9,752,361 B2 | 9/2017 | Park | |
| 9,791,653 B2 * | 10/2017 | Aznag | G02B 6/4452 |
| 9,857,547 B2 * | 1/2018 | Claessens | G02B 6/444 |
| 9,864,415 B2 | 1/2018 | Siddiqui | |
| 9,952,397 B2 | 4/2018 | Hanson et al. | |
| 10,001,819 B2 | 6/2018 | Heyd et al. | |
| 10,037,057 B2 | 7/2018 | Schafer et al. | |
| 10,444,455 B2 * | 10/2019 | Aznag | G02B 6/4444 |
| 10,509,187 B2 | 12/2019 | Carapella et al. | |
| 10,649,167 B2 | 5/2020 | Cornelissen et al. | |
| 10,914,908 B2 | 2/2021 | Hanson et al. | |
| 11,016,257 B2 * | 5/2021 | Aznag | G02B 6/4452 |
| 11,105,987 B2 | 8/2021 | Geens et al. | |
| 11,187,865 B2 | 11/2021 | Kempeneers et al. | |
| 11,275,226 B2 | 3/2022 | Claessens et al. | |
| 11,516,327 B2 | 11/2022 | Allen | |
| 11,592,637 B2 | 2/2023 | Claessens et al. | |
| 11,698,500 B2 | 7/2023 | Hanson et al. | |
| 11,719,900 B2 | 8/2023 | Carapella et al. | |
| 11,747,583 B2 * | 9/2023 | Aznag | G02B 6/4452 |
| | | | 385/135 |
| 2002/0073508 A1 | 6/2002 | Rude | |
| 2004/0247277 A1 | 12/2004 | Spayes et al. | |
| 2006/0054520 A1 | 3/2006 | Gelardi et al. | |
| 2006/0147173 A1 | 7/2006 | Womack et al. | |
| 2006/0153362 A1 | 7/2006 | Bloodworth et al. | |
| 2006/0153516 A1 | 7/2006 | Napiorkowski et al. | |
| 2007/0272440 A1 | 11/2007 | Grunwald et al. | |
| 2008/0142384 A1 | 6/2008 | Gelardi | |
| 2008/0219632 A1 * | 9/2008 | Smith | H04Q 1/023 |
| | | | 385/135 |
| 2008/0292249 A1 | 11/2008 | Kimura et al. | |
| 2008/0310811 A1 | 12/2008 | Gonzales et al. | |
| 2009/0060439 A1 | 3/2009 | Cox et al. | |
| 2009/0159473 A1 | 6/2009 | Roth et al. | |
| 2009/0238531 A1 * | 9/2009 | Holmberg | G02B 6/4441 |
| | | | 385/135 |
| 2009/0238532 A1 * | 9/2009 | Smith | H04Q 1/023 |
| | | | 385/135 |
| 2010/0220967 A1 | 9/2010 | Cooke et al. | |
| 2010/0242251 A1 | 9/2010 | Cooke et al. | |
| 2011/0047750 A1 | 3/2011 | Novin | |
| 2011/0097051 A1 | 4/2011 | Vermeulen et al. | |
| 2011/0097053 A1 * | 4/2011 | Smith | H04Q 1/142 |
| | | | 385/135 |
| 2011/0299823 A1 | 12/2011 | Bran de Leon et al. | |
| 2012/0224305 A1 | 9/2012 | Yoo | |
| 2013/0243386 A1 | 9/2013 | Pimentel et al. | |
| 2013/0249231 A1 | 9/2013 | Winiger et al. | |
| 2014/0026363 A1 | 1/2014 | Novin | |
| 2014/0102021 A1 | 4/2014 | Gosling et al. | |
| 2014/0313653 A1 | 10/2014 | Daley, III | |
| 2014/0321825 A1 | 10/2014 | Claessens et al. | |
| 2015/0168663 A1 | 6/2015 | Aznag et al. | |
| 2016/0073544 A1 | 3/2016 | Heyd et al. | |
| 2016/0091681 A1 | 3/2016 | Hanson et al. | |
| 2016/0103289 A1 | 4/2016 | Campbell et al. | |
| 2016/0238811 A1 | 8/2016 | Simmons et al. | |
| 2017/0227728 A1 | 8/2017 | Claessens et al. | |
| 2017/0235347 A1 | 8/2017 | Heyd et al. | |
| 2017/0276892 A1 | 9/2017 | Geling et al. | |
| 2017/0363831 A1 | 12/2017 | Cornelissen et al. | |
| 2018/0039037 A1 * | 2/2018 | Aznag | G02B 6/4442 |
| 2018/0231730 A1 | 8/2018 | Geens et al. | |
| 2018/0239098 A1 | 8/2018 | Hanson et al. | |
| 2018/0252888 A1 | 9/2018 | Carapella et al. | |
| 2019/0350398 A1 | 11/2019 | Raphael et al. | |
| 2020/0049916 A1 * | 2/2020 | Aznag | G02B 6/4454 |
| 2020/0110238 A1 | 4/2020 | Geens et al. | |
| 2020/0124813 A1 | 4/2020 | Carapella et al. | |
| 2021/0126996 A1 | 4/2021 | Allen | |
| 2021/0165167 A1 | 6/2021 | Dubey et al. | |
| 2021/0165179 A1 | 6/2021 | Hanson et al. | |
| 2021/0286216 A1 * | 9/2021 | Aznag | G02B 6/4444 |
| 2022/0007089 A1 | 1/2022 | Claessens et al. | |
| 2022/0094201 A1 | 3/2022 | Haug et al. | |
| 2022/0187556 A1 * | 6/2022 | Claessens | G02B 6/4455 |
| 2022/0196955 A1 | 6/2022 | Claessens et al. | |
| 2023/0096710 A1 * | 3/2023 | Claessens | G02B 6/4452 |
| | | | 385/135 |
| 2023/0164257 A1 | 5/2023 | Allen | |
| 2023/0251442 A1 * | 8/2023 | Meadowcroft | G02B 6/423 |
| | | | 385/139 |

FOREIGN PATENT DOCUMENTS

| | | |
|---|---|---|
| DE | 10 2019 121 479 A1 | 2/2021 |
| DE | 10 2019 121 480 A1 | 2/2021 |
| DE | 10 2019 121 427 B4 | 3/2021 |
| EP | 2 369 388 A1 | 9/2011 |
| EP | 2 381 283 B1 | 7/2013 |
| EP | 2 533 086 A1 | 12/2013 |
| EP | 2 490 057 B1 | 4/2017 |
| FR | 2 898 417 B1 | 9/2008 |
| JP | 5334190 B2 | 11/2013 |
| KR | 20-0380996 Y1 | 4/2005 |
| WO | 94/12904 A2 | 6/1994 |

(56) References Cited

FOREIGN PATENT DOCUMENTS

| | | |
|---|---|---|
| WO | 02/097488 A2 | 12/2002 |
| WO | 2009/089327 A2 | 7/2009 |
| WO | 2009/131895 A2 | 10/2009 |
| WO | 2012/019936 A1 | 2/2012 |
| WO | 2012/110452 A1 | 8/2012 |
| WO | 2013/149846 A1 | 10/2013 |
| WO | 2016/042032 A1 | 3/2016 |
| WO | 2017/184508 A1 | 10/2017 |
| WO | 2019/123496 A1 | 6/2019 |
| WO | 2019/160995 A1 | 8/2019 |
| WO | 2019/209643 A1 | 10/2019 |
| WO | 2020/150392 A1 | 7/2020 |
| WO | 2020/198155 A1 | 10/2020 |
| WO | 2020/205554 A1 | 10/2020 |
| WO | 2020/205569 A1 | 10/2020 |
| WO | 2021/011541 A1 | 1/2021 |
| WO | 2023/283340 A1 | 1/2023 |

OTHER PUBLICATIONS

International Search Report and Written Opinion of the International Searching Authority for International Patent Application No. PCT/US2019/029303 mailed Aug. 9, 2019, 11 pages.

International Search Report and Written Opinion of the International Searching Authority for International Patent Application No. PCT/US2020/013745 mailed May 8, 2020, 10 pages.

International Search Report and Written Opinion of the International Searching Authority for International Patent Application No. PCT/US2020/025352 mailed Jul. 23, 2020, 11 pages.

International Search Report and Written Opinion of the International Searching Authority for International Patent Application No. PCT/US2020/041940 mailed Nov. 5, 2020, 12 pages.

International Search Report and Written Opinion of the International Searching Authority for International Patent Application No. PCT/US2020/025363 mailed Jul. 28, 2020, 12 pages.

* cited by examiner

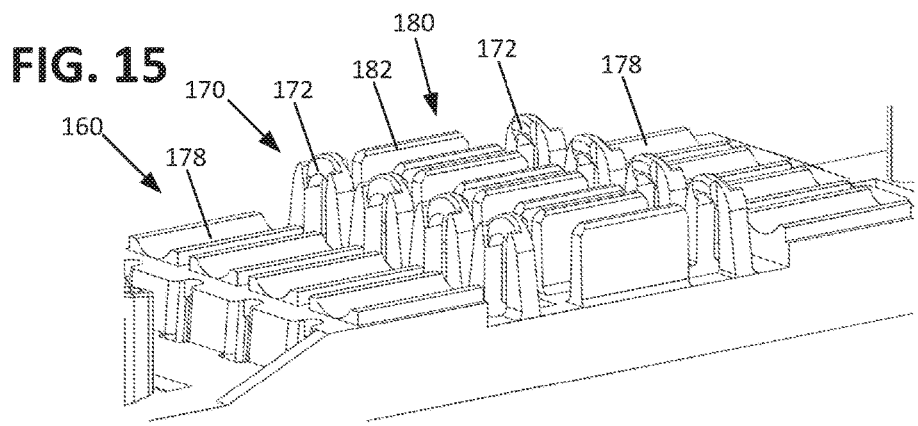
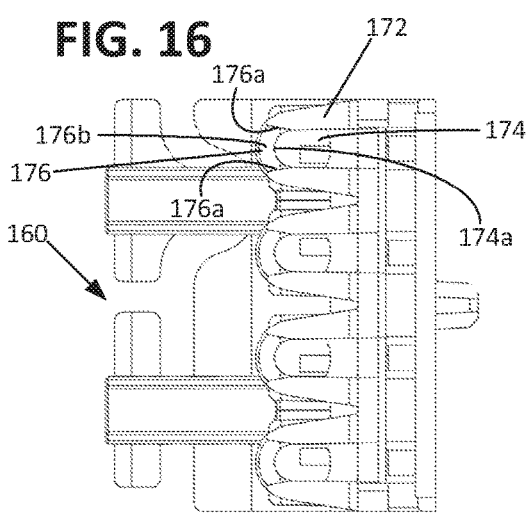
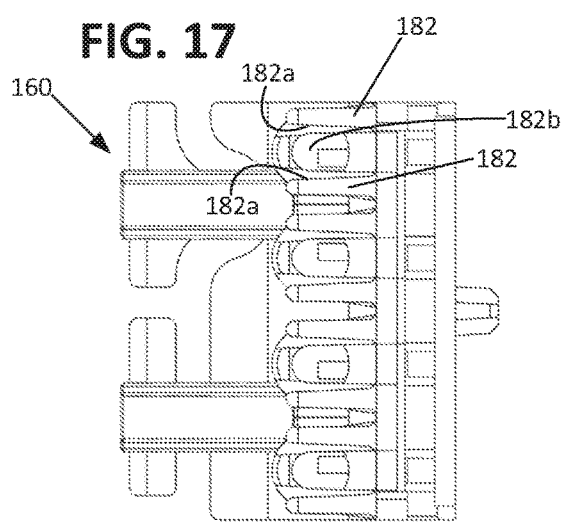
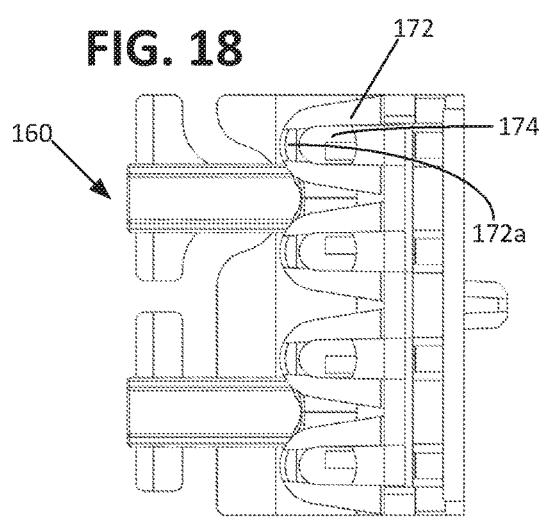
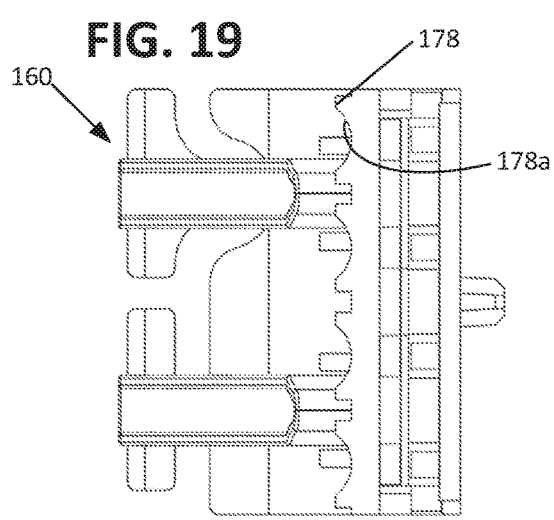

TRAY HINGE INTERFACE SYSTEM WITH OPPOSING RECESSED SURFACES RECESSED TOWARD THE PIVOT AXIS

CROSS-REFERENCE TO RELATED APPLICATIONS

This application is a National Stage Application of PCT/US2020/025363, filed on Mar. 27, 2020, which claims the benefit of U.S. Patent Application Ser. No. 62/868,113, filed on Jun. 28, 2019, and claims the benefit of U.S. Patent Application Ser. No. 62/876,498, filed on Jul. 19, 2019, and claims the benefit of U.S. Patent Application Ser. No. 62/826,697, filed on Mar. 29, 2019, and claims the benefit of U.S. Patent Application Ser. No. 62/876,518, filed on Jul. 19, 2019, the disclosures of which are incorporated herein by reference in their entireties. To the extent appropriate, a claim of priority is made to each of the above disclosed applications. The following disclosures are also incorporated herein by reference in their entireties: U.S. Patent Application Ser. No. 62/826,686, filed on Mar. 29, 2019; and U.S. Patent Application Ser. No. 62/876,508, filed on Jul. 19, 2019.

BACKGROUND

To increase storage density, some telecommunications equipment resides in stacked and hinged trays. In order to gain access to one of the hinged trays, the trays above that tray must be rotated up and held in this position. In some prior art designs, a separate member, sometimes referred to as a "kickstand" is provided on each tray that can be rotated to hold the tray and all above trays in the upward position. Necessarily, the kickstand must be designed to hold the weight of multiple trays. In some configurations, multiple trays are rotatably mounted to a tower or base structure via a hinged connection point. Improvements are desired.

SUMMARY

A telecommunications tray assembly is disclosed. The assembly can include a groove plate, a telecommunications tray, a connection arrangement rotatably connecting the tray to the groove plate, a positioning arrangement enabling the telecommunications tray to be rotated, with respect to the groove plate, between a first rotational position, a second rotational position, and a third rotational position. In some aspects, the positioning arrangement allows the telecommunications trays to generally freely rotate between the first and second rotational positions, provides resistance to rotation of the telecommunications tray between the second and third rotational positions, and provides a resistive force to retain the telecommunications tray in the third rotational position. In some examples, the rotational angle of the telecommunications tray between the first and second rotational positions is less than 90 degrees and the rotational angle of the telecommunications tray between the second and third rotational positions is less than 90 degrees.

In some examples, the second rotational position is 45 degrees relative to the first rotational position.

In some examples, the third rotational position is 45 degrees relative to the second rotational positions.

In some examples, the positioning arrangement includes a positioning member located on the telecommunications tray received in an open channel located on the second telecommunications tray.

In some examples, the positioning member includes three pair of opposing exterior surfaces.

In some examples, the connection arrangement includes a hinge member associated with one of the telecommunications tray and the groove plate and an aperture receiving the hinge member on the other of the telecommunications tray and the groove plate.

In some examples, the hinge member is positioned on a first support arm and the aperture is positioned on a second support arm.

In some examples, one or both of the first and second support arms is deflectable.

In some examples, the hinge member and the first arm includes a pair of hinge members and a pair of first support arms and wherein the aperture and the second support arm includes a pair of apertures and a pair of second support arms.

A telecommunications tray assembly can include a groove plate, a telecommunications tray, a connection arrangement rotatably connecting the tray to the groove plate, and a positioning arrangement. In some aspects, the positioning arrangement allows the telecommunications trays to generally freely rotate between the first and second rotational positions, provides resistance to rotation of the telecommunications tray between the second and third rotational positions, and provides a resistive force to retain the telecommunications tray in the third rotational position.

In some examples, the positioning member has a single axis of rotational symmetry.

In some examples, the positioning member has two or fewer axes of rotational symmetry.

In some examples, the positioning member is a positioning member located on the telecommunications tray received in an open channel located on the second telecommunications tray.

In some examples, the positioning member includes three pair of opposing exterior surfaces.

In some examples, at least one of the three pairs of opposing exterior surfaces has a different cross-sectional length than a cross-sectional length of another of the three pairs of opposing exterior surfaces.

In some examples, each of the three pairs of opposing exterior surfaces has a different cross-sectional length than a cross-sectional length of the other two pairs of opposing exterior surfaces.

In some examples, the positioning member has a cross-sectional height and a cross-sectional width, and wherein the cross-sectional height is unequal to the cross-sectional width.

A telecommunications tray assembly can include a groove plate; a telecommunications tray, and a connection arrangement rotatably connecting the tray to the groove plate, the connection arrangement including a pair of arms defining apertures receiving a pair of hinge members, wherein the apertures have an elongate cross-sectional shape and the pair of hinge members have a circular cross-sectional shape.

In some examples, the tray assembly can further include at least one support member slidably engaged with at least one channel, wherein contact between the at least one channel and the at least one support member forces the pair of hinge members to abut against an inner distal surface of the apertures.

In some examples, the apertures have a width generally equal to a diameter of the hinge members and wherein the apertures have a length that is greater than the diameter of the hinge members.

A telecommunications tray assembly can include a stack of telecommunications trays, the stack being pivotally connected to a base and being rotatable between a storage position and an access position. Each of the trays can be provided with a positioning arrangement enabling each of the telecommunications tray to be rotated, with respect to the stack, between a first rotational position associated with the storage position and closed position of the tray, a second rotational position associated with the access position and a closed position of the tray, and a third rotational position associated with the access position and an open position of the tray. The positioning arrangement allows the telecommunications tray to generally freely rotate between the first and second rotational positions, provides resistance to rotation of the telecommunications tray between the second and third rotational positions, and provides a resistive force to retain the telecommunications tray in the third rotational position.

In some examples, the second rotational position is 45 degrees relative to the first rotational position.

In some examples, the third rotational position is 45 degrees relative to the second rotational positions.

In some examples, the positioning arrangement includes a positioning member located on the telecommunications tray received in an open channel located on the groove plate.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 15 is a perspective view of a portion of the groove plate shown in FIG. 12.

FIG. 16 is a cross-sectional view of the groove plate shown in FIG. 9, taken along the line 16-16 in FIG. 14.

FIG. 17 is a cross-sectional view of the groove plate shown in FIG. 9, taken along the line 17-17 in FIG. 14.

FIG. 18 is a cross-sectional view of the groove plate shown in FIG. 9, taken along the line 18-18 in FIG. 14.

FIG. 19 is a cross-sectional view of the groove plate shown in FIG. 9, taken along the line 19-19 in FIG. 14.

DETAILED DESCRIPTION

Figure 1:
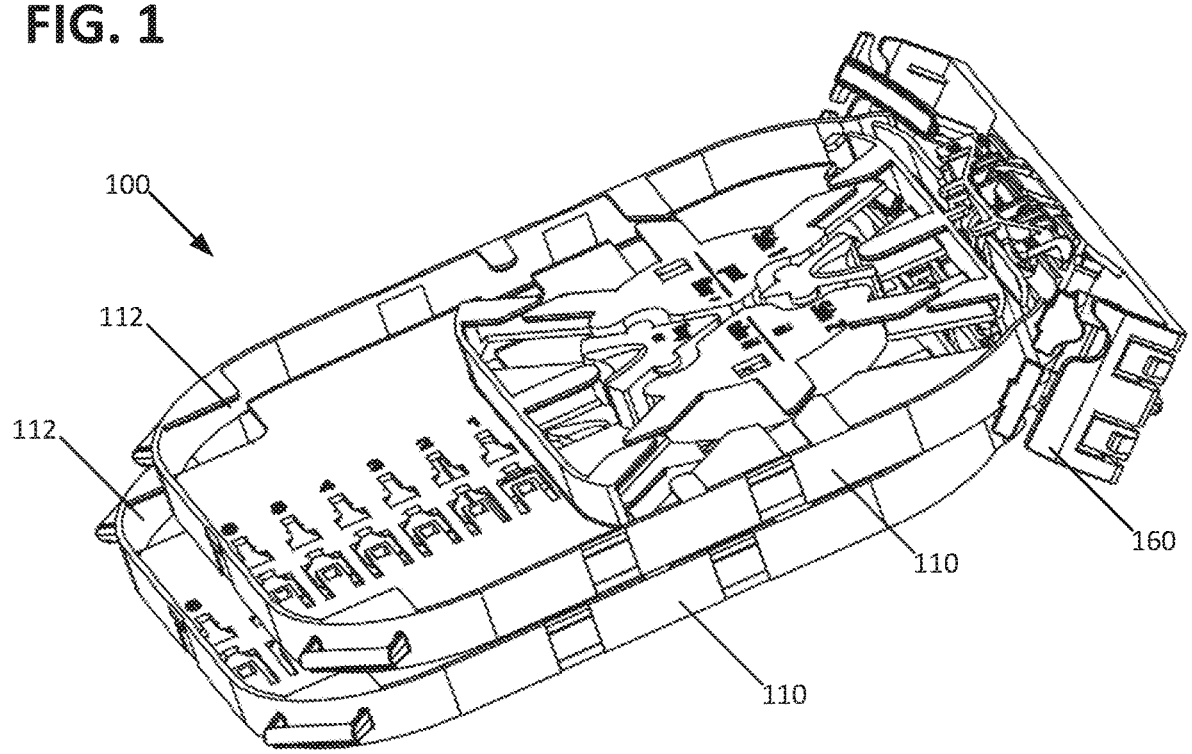
FIG. 1 is a top perspective view of a schematic representation of a telecommunications tray assembly having features in accordance with the present disclosure.
Figure 2:
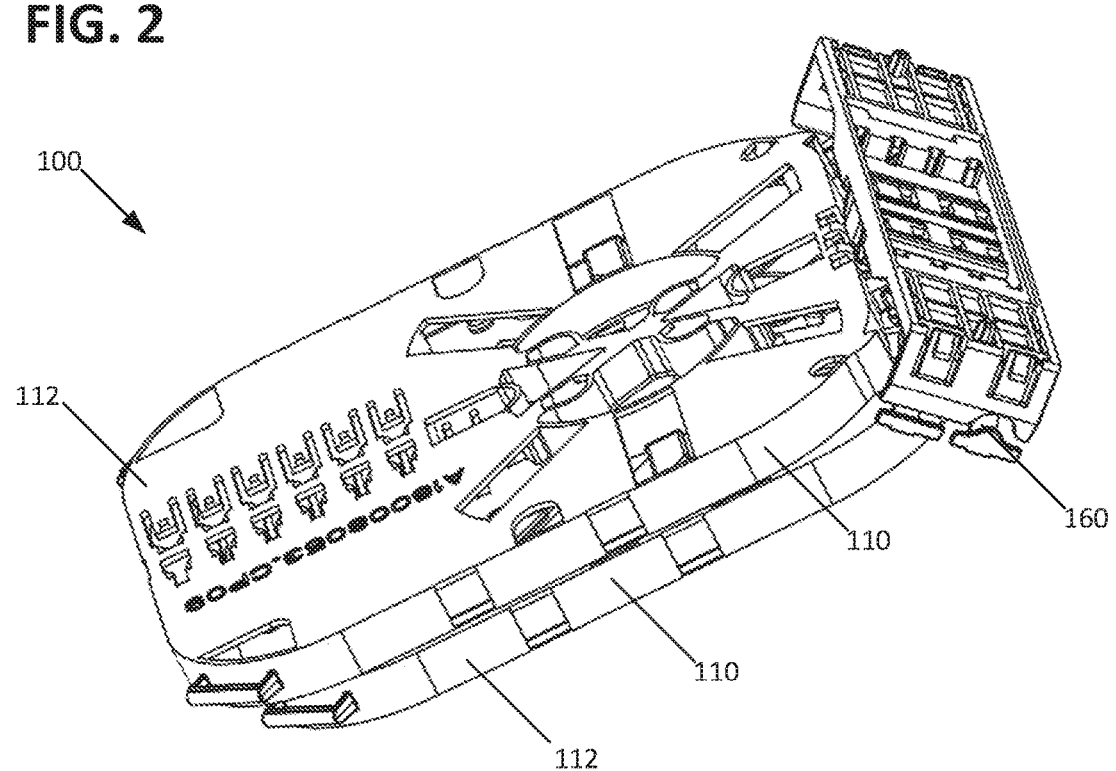
FIG. 2 is a bottom perspective view of the tray assembly shown in FIG. 1.
Figure 3:
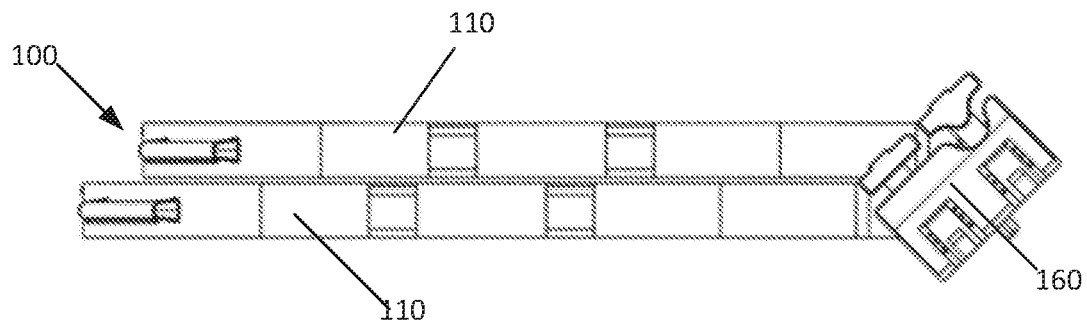
FIG. 3 is a side view of the tray assembly shown in FIG. 1, with both trays in a first position.
Figure 4:
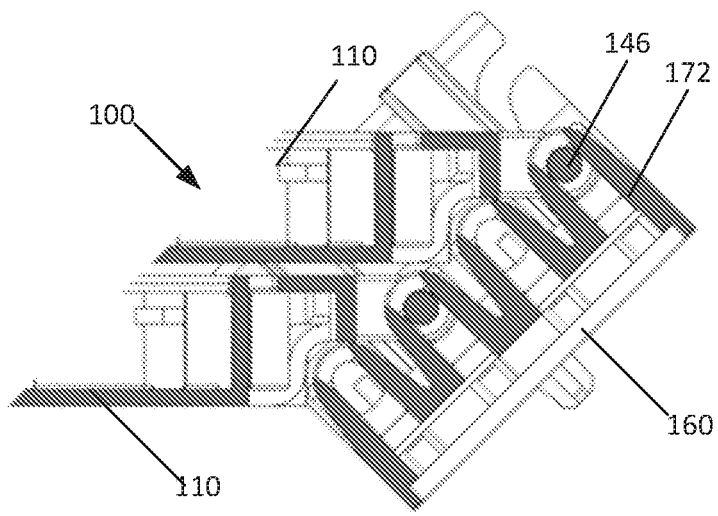
FIG. 4 is a longitudinal cross-section of the tray assembly shown in FIG. 3 at the location of a hinge arrangement.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

It is noted that the following description may utilize directional language (e.g. raised, lowered, upper, lower, horizontal, vertical, etc.) that indicates a particular orientation. Although the disclosed tray assemblies 100 can be oriented as shown in the drawings, many other orientations are possible, and the directional language used herein should not be taken to limit the disclosure.

Figure 41:
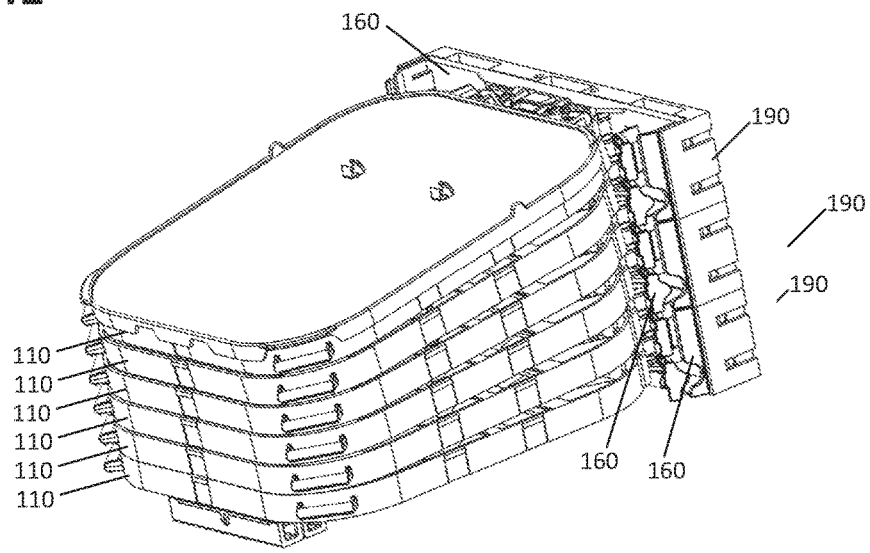
FIG. 41 is a perspective view of a tray assembly stack showing an alternative support frame assembly for supporting the groove plates of the tray assembly shown in FIG. 1.
Figure 42:
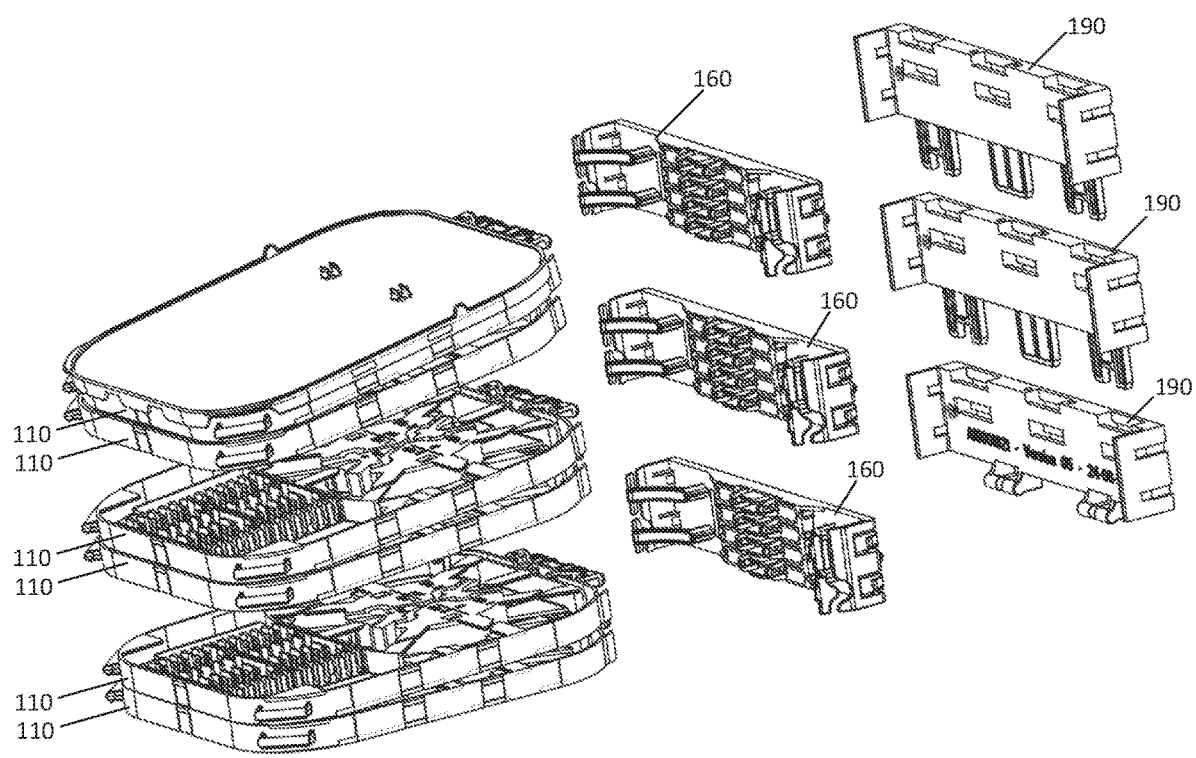
FIG. 42 is an exploded perspective view of the tray assembly stack shown in FIG. 41.

Referring to FIGS. 1-8, a tray assembly 100 is presented. As shown, the tray assembly 100 includes a plurality of stacked trays 110 rotatably connected to and supported by a groove plate 160. In one aspect, and as most easily seen at FIGS. 38 to 42, the groove plates 160 can be mounted to interconnected support frames 190 with a snap-fit type of connection or via another method, such as with fasteners. In the example shown at FIGS. 38 to 40, two interconnected support frames 190 are provided to which two groove plates 160 are attached to each. In the example shown at FIGS. 41 to 42, a single groove plate 160 is mounted to a single support frame 190, wherein a total of three groove plates 160 and three support frames 190 are provided. The support frames 190 can also be configured to hold fewer or more groove plates 160, for example, a support frame 190 could be configured to hold only a single groove plate 160 or more than two groove plates 160, such as four or more groove plates 160. Some examples of support frames 190 usable with the tray assembly 100 are shown and described in U.S. Provisional Patent Application Ser. No. 62/826,697, filed on Mar. 29, 2019, the entirety of which is hereby incorporated by reference. In an alternative arrangement, the groove plates 160 can be configured to interconnect with each other such that multiple tray assemblies 100 can be stacked together. In the example shown, two stacked trays 110 are provided on each groove plate 160. However, the groove plates 160 are provided with four mounting locations such that four shallower trays can also be mounted to each groove plate 160. It is also possible to configure a groove plate supporting other numbers of trays, for example, one, two, six, or more trays 110 may be mounted onto a groove plate 160 configured with fewer or more mounting locations.

As shown, the trays 110 are connected to the groove plate 160 via a connection arrangement 114 with interconnecting features provided on the trays 110 and the groove plate 160. The tray assembly 100 also includes positioning features that enable the trays 110 to be held at predetermined rotational positions with respect to the groove plate 160. The positioning features includes interconnecting features provided on the trays 110 and the groove plate 160.

Referring to FIGS. 20 to 28, a single tray 110 is shown in isolation. As referenced previously, the tray 110 includes a main body portion 112. The main body portion 112 is shown as defining a base surface or end wall 112a from which perimeter sidewalls 112b extends. Together, the end wall 112a and sidewalls 112b define an interior storage space 112c for housing telecommunications cables and other related components. The main body 112 is also shown with retention features 112c, 112d such as projections and structures, to facilitate the retention of telecommunications components and cables. In some examples, the tray 110 is configured as a fiber optic splice tray.

Still with reference to FIGS. 20 to 28, a first portion 140 of the connection arrangement 114 can be viewed in further detail. The first portion 140 is the part of the connection arrangement 114 that is associated with the tray 110 and is configured to interconnect with a second portion 170 of the connection arrangement 114 associated with the groove plate 160.

In one aspect, the first portion 140 of the connection arrangement 114 includes a support wall or sidewall 142 extending from the end wall 112a of the tray 110. A pair of arms 144 extend from the sidewall 142 with a hinge member 146 extending from each of the arms 144. As shown, the arms 144 extend in a generally parallel relationship to each other and parallel with a longitudinal axis X of the tray. The hinge members 146 extending towards each other from the arms 144 such that the hinge members 146 extend generally orthogonal to the longitudinal axis X. In one aspect, the hinge members 146 are coaxially aligned along a common axis, which defines the pivot axis P of the tray 110. As most easily viewed at FIGS. 23 and 27, the hinge members 146 are generally cylindrical in shape with a circular cross-section and further include a ramped surface 146a at the distal end 146b of the hinge member 146. As shown, the ramped surface 146a extends at an oblique angle to the axis X and the axis P and faces away from the support wall 142 to give the hinge member 146 a generally tapered shape at the distal end 146b. As discussed later in more detail, the ramped surface 146a and the deflectability of the deflectable member 144 enable the tray 110 to be more easily connected to the groove plate 16. The first part 140 of the connection arrangement 114 can also include a first pair of support members 148 and a second pair of support members 149 extending from the wall 142. The support members 148, 149 are shown as being located on the outbound sides of the arms 144 and are provided with a rounded distal ends 148a, 149a. In one aspect, the rounded distal ends 148a, 149a have a circular shape. In one aspect, a support wall 147 extends between the support members 148, 149 to increase the structural integrity of the support members 148, 149. In an alternative arrangement, a single support member 148 or 149 could be used on each side of the arms 144. In an alternative arrangement, a single cylindrically shaped support member having a length equal to the distance between the support members 148, 149 could be used instead of a pair of spaced apart support members 148, 149.

The second portion 170 of the connection arrangement 114, most easily viewed at FIGS. 12-14, 16, and 18 is shown as including a pair of arms 172, with each defining an aperture 174 for receiving the hinge members 146 on the tray 110. In the example shown, each apertures 174 has an elongate shape, such as an oblong or slotted shape with a width that is generally equal to the diameter of the hinge members 146 and a length that is greater than the diameter of the hinge members 146. In one aspect, the arms 172 are provided with a recess or channel structure 176 extending from the distal end of the deflectable member 172 to the aperture 174. The channel structure 176 defines side surfaces 176a and an end surface 176b. As shown, each of the surfaces 176a, 176b is sloped such that the channel structure narrows in each dimension towards the aperture 174. The configuration of the channel structure 176 operates to initially receive and guide the hinge members 146 into the apertures 174. When installing a tray 110 onto the groove plate 160, the tray 110 is oriented such that hinge members 146 are initially aligned with the channel structures 176 and such that the ramped surfaces 146a of the hinge members 146 will initially contact the sloped end surface 176b of the channel structure 176. The distance between the distal ends 146b of the hinge members is greater than the distance between the arms 172 and apertures 174. Accordingly, as the tray 110 is moved towards the groove plate 16, the contact between the hinge members 146 and end surfaces 176b will cause the arms 144 to expand in an outward direction and will cause the arms 172 to deflect in an inward direction until the hinge members 146 are received into the apertures 174. At this point, the arms 144 and 172 snap back into their natural resting state and a snap-fit type connection results. Simultaneously, the distal ends 148a, 149a of the support members 148, 149 are brought into contact with channels or grooves 178 on the groove plate 160. Each of the channels or grooves 178 have rounded or circular concave surfaces 178a that are complementary to the distal ends 148a, 149a of the support members 148, 149. The surfaces 148a, 149a, 178a remain in contact while the tray 110 rotates relative to the groove plate 160 and also define a maximum insertion of the tray 110 with respect to the groove plate 160. Thus the support members 148 and the channels or grooves 178 cooperate to ensure that the hinge members 146 are properly positioned within the apertures 174 such that the hinge members 146 are held proximate and/or pressed against an inner distal end surface 174a of the apertures 174 and also to ensure that the positioning members 154 are properly positioned between the below-discussed walls 182 of the groove plate 160. With such a configuration the tray is able to pivot about a static pivot axis X even though the apertures 174 are not round and centered on the pivot axis. Also, with the configuration of the arms 172 having elongate apertures 174 that are open to the back side of the support plate 160, the support plate 160 is more easily moldable as slide pins are not needed to form a circular, enclosed aperture.

In one aspect, the arms 172 can also be provided with a thickened portion or projection 172a at the distal end of the arms 172 and opposite the end wall 176b. The additional material provided by the projection 172a adds structural integrity to the arms 172 above the aperture 174 where the channel structure 176 has decreased the material thickness of the arms 172. Once connected, the tray 110 can rotate with respect to the groove plate 160. Although both pairs of arms 144 and 174 are described as being deflectable, one set of arms can be configured to be relatively more flexible than the other pair of arms such that the majority or all of the deflection occurs in one set of arms with little or no deflection occurring in the other set of arms. In an alternative arrangement, the hinge members could be provided on arms 172 while the apertures could be provided on the arms 144.

In one aspect, the tray 110 also includes a first part 150 of a positioning arrangement. As shown, the positioning arrangement includes a pair of extension members 152 extending from the support wall or sidewall 142 with a positioning member 154 extending therebetween. As shown, the extension members 152 extend in a generally parallel relationship to each other and parallel with a longitudinal axis X of the tray. The positioning member 154 extends generally orthogonal to the longitudinal axis X and is coaxially aligned with the pivot axis P of the tray 110 and the hinge members 146. As most easily seen at FIG. 28, the positioning member 154 is provided with exterior surfaces 154a, 154b, 154c, 154d, 154e, and 154f. The exterior surfaces 154a-154 interact with the second part 180 of the positioning arrangement.

As most easily seen at FIGS. 12-14 and FIG. 17, the second part 180 of the positioning arrangement is shown. Each positioning arrangement second part 180 is shown as having spaced apart walls 182 with interior surfaces 182a defining an open channel 182b. The walls 182 are disposed in a generally parallel arrangement, but the interior surfaces 182a do diverge at a small angle towards the distal end such that the distance between the interior surfaces 182a at the distal ends of the walls 182 is wider than at the base end of the walls 182 such that the positioning member 154 can be more easily received into the open channel 182b. Once the tray 110 is connected to the groove plate 160, the positioning member 154 resides in the open channel 182b.

Figure 9:
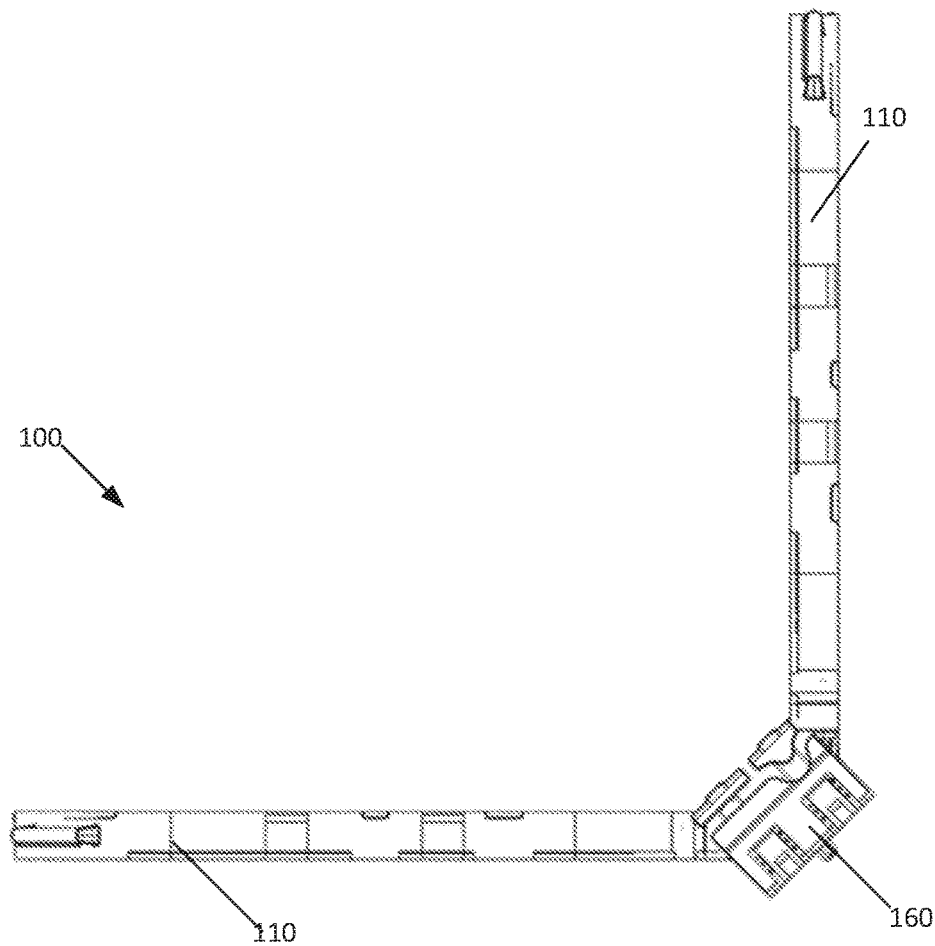
FIG. 9 is a side view of the tray assembly shown in FIG. 1, with the top tray in a third positon and the bottom tray in the first position.
Figure 10:
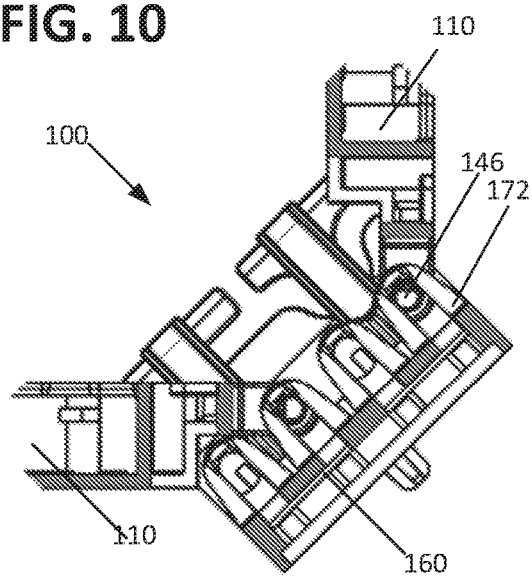
FIG. 10 is a longitudinal cross-section of the tray assembly shown in FIG. 9 at the location of the hinge arrangement.
Figure 11:
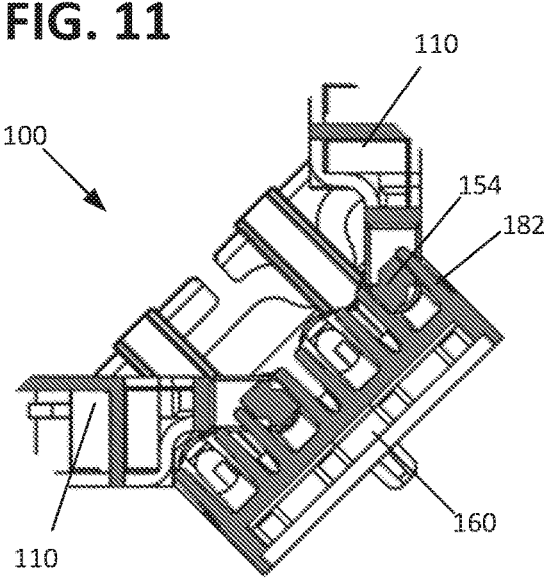
FIG. 11 is a longitudinal cross-section of the tray assembly shown in FIG. 9 at the location of the positioning arrangement.
Figure 12:
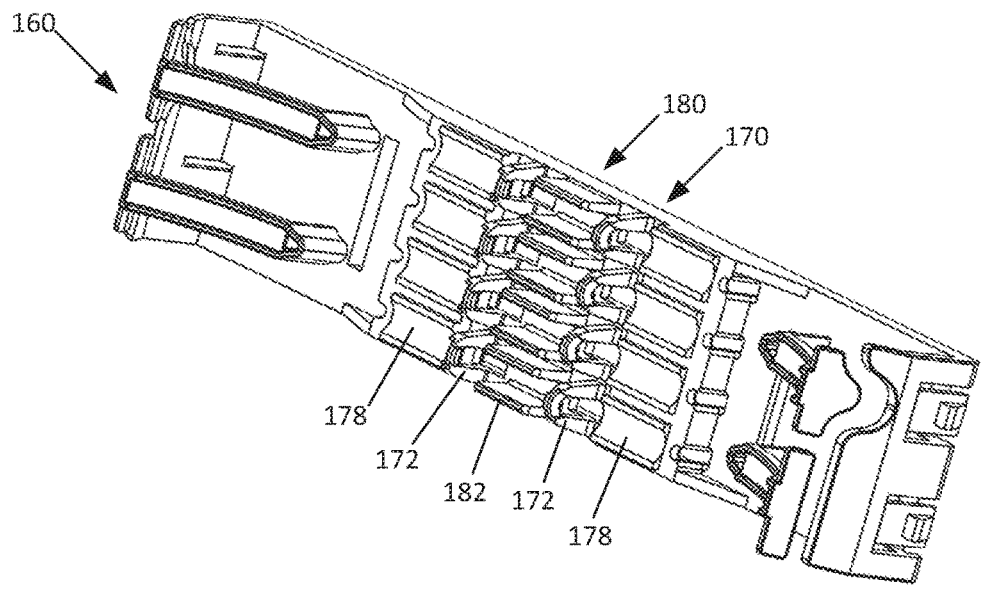
FIG. 12 is a perspective view of a groove plate of the tray assembly shown in FIG. 1.
Figure 13:
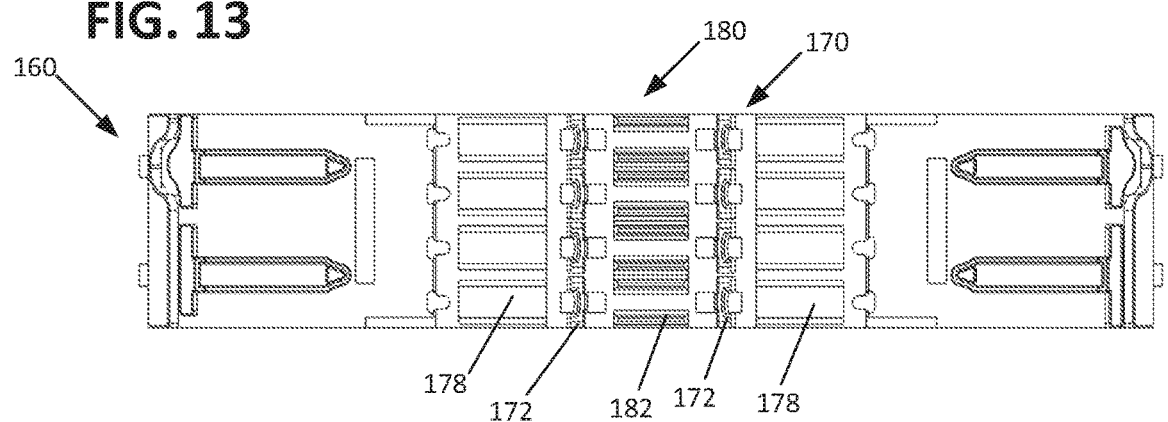
FIG. 13 is a front view of the groove plate shown in FIG. 12.
Figure 14:
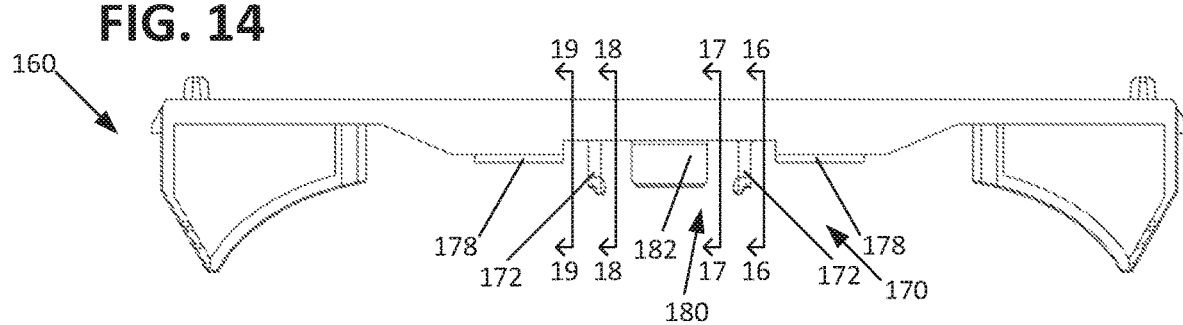
FIG. 14 is a top view of the groove plate shown in FIG. 12.
Figure 20:
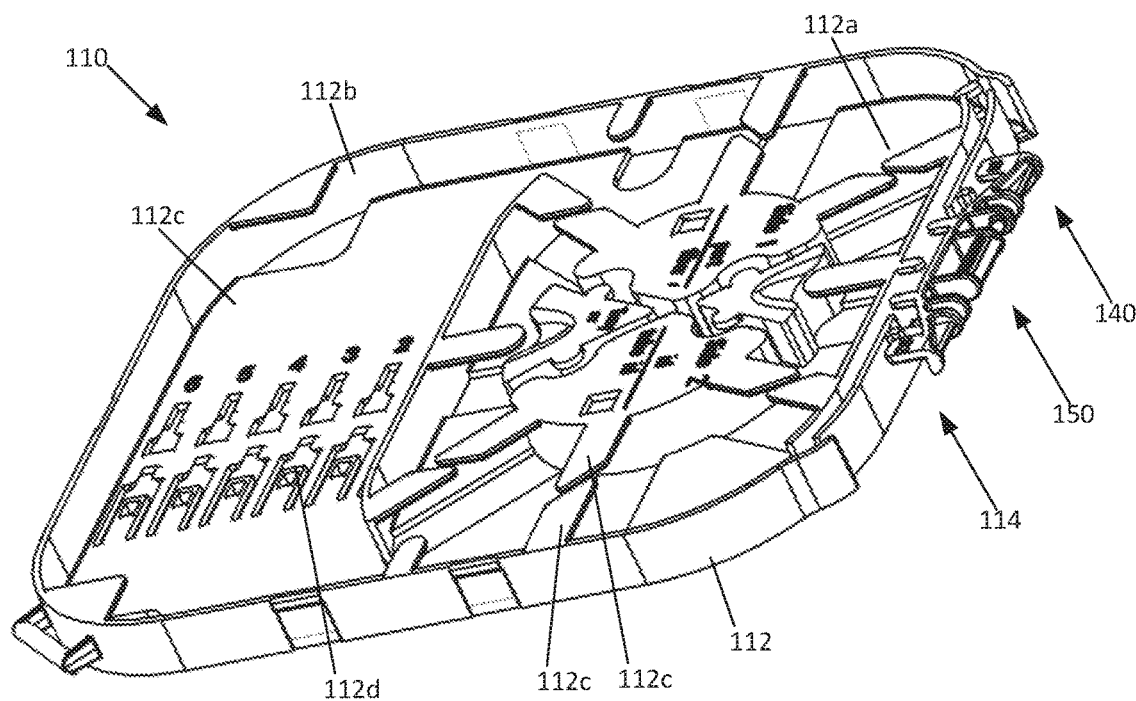
FIG. 20 is a perspective view of a tray of the tray assembly shown in FIG. 1.
Figure 21:
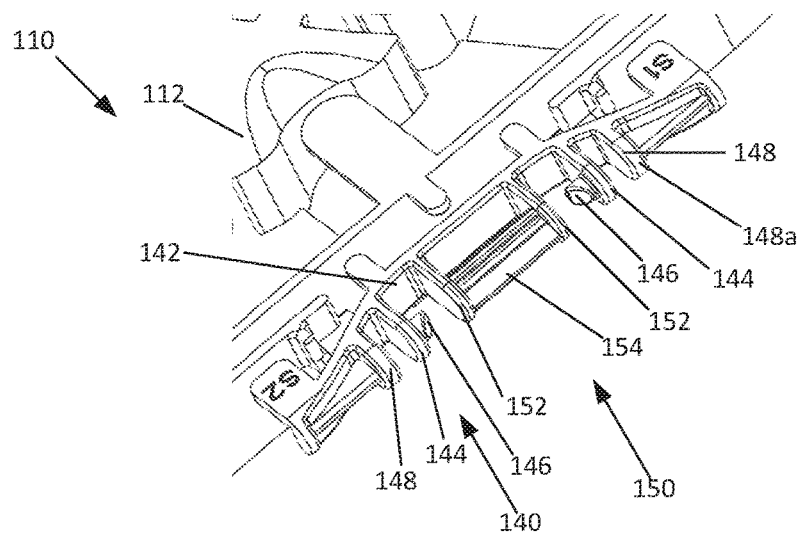
FIG. 21 is an enlarged perspective view of a portion of the tray shown in FIG. 20.
Figure 22:
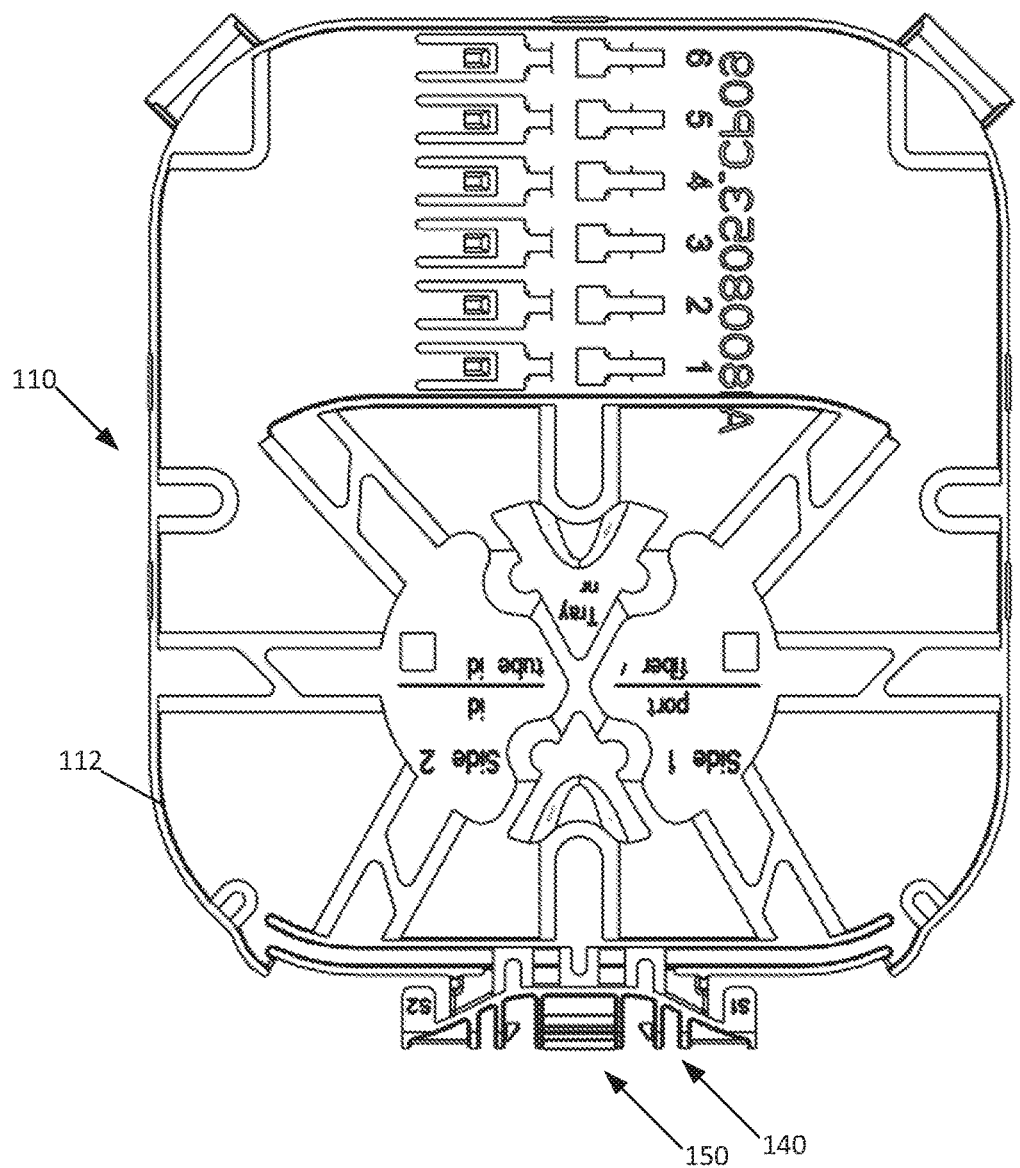
FIG. 22 is top view of the tray shown in FIG. 20.
Figure 23:
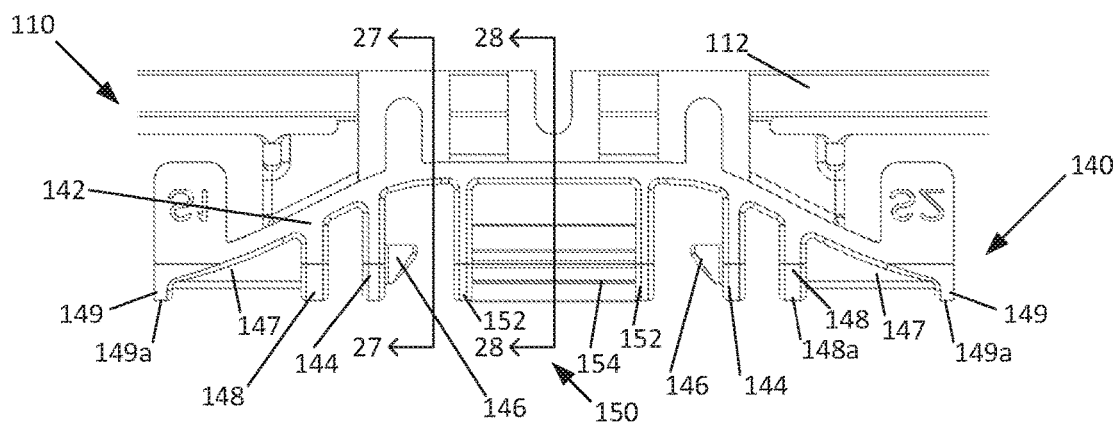
FIG. 23 is an enlarged top view of a portion of the tray shown in FIG. 20.
Figure 24:
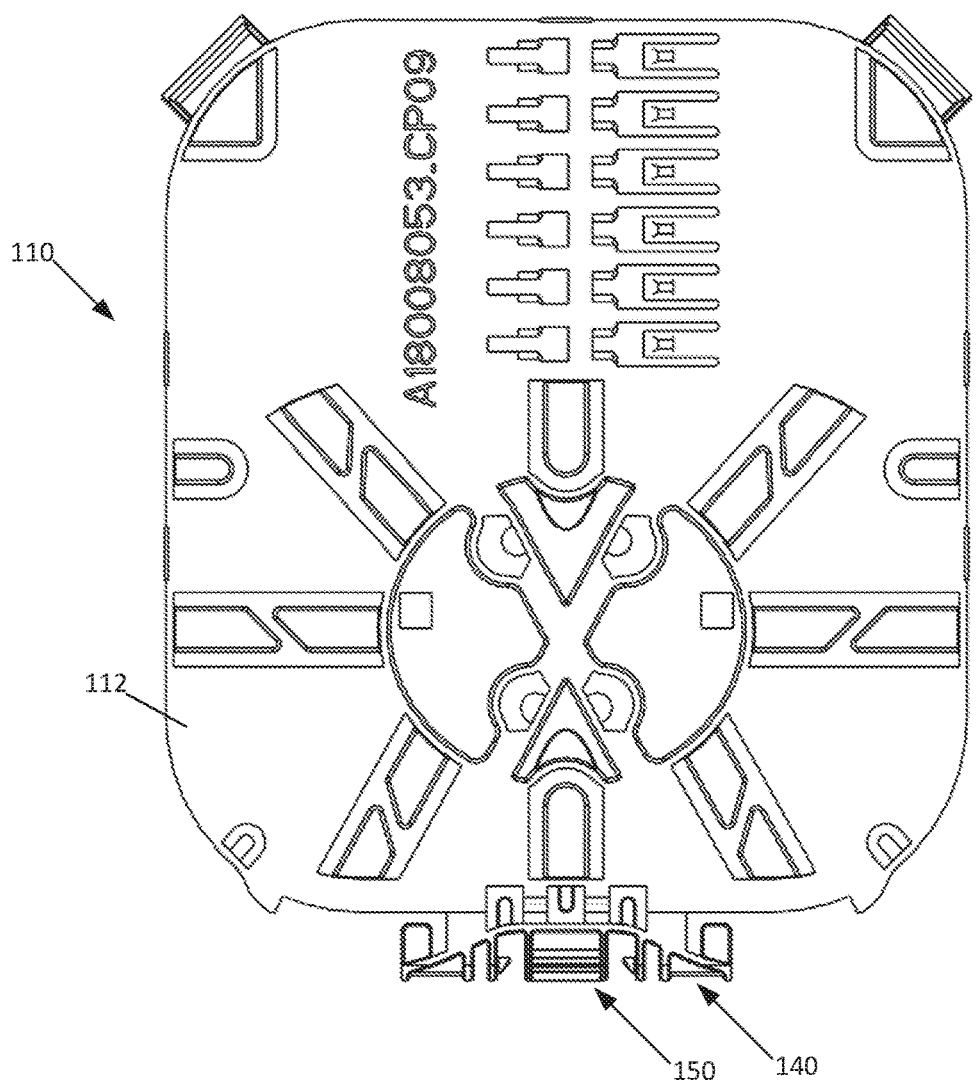
FIG. 24 is a bottom view of the tray shown in FIG. 20.
Figure 25:
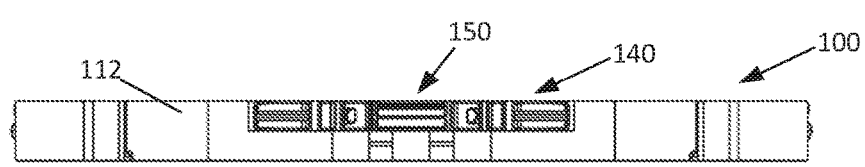
FIG. 25 is an end view of the tray shown in FIG. 20.
Figure 26:
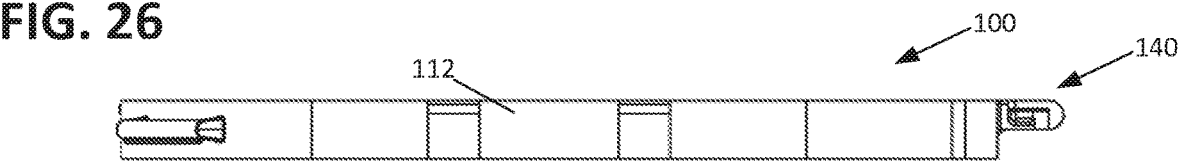
FIG. 26 is a side view of the tray shown in FIG. 20.
Figure 27:
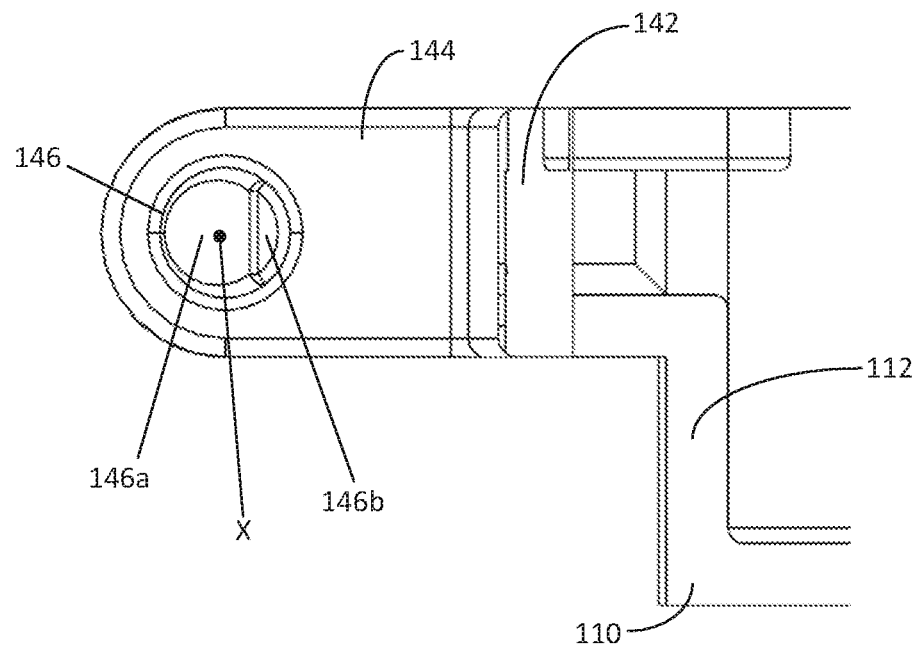
FIG. 27 is a cross-sectional view of the tray shown in FIG. 20, taken along the line 27-27 in FIG. 23.
Figure 28:
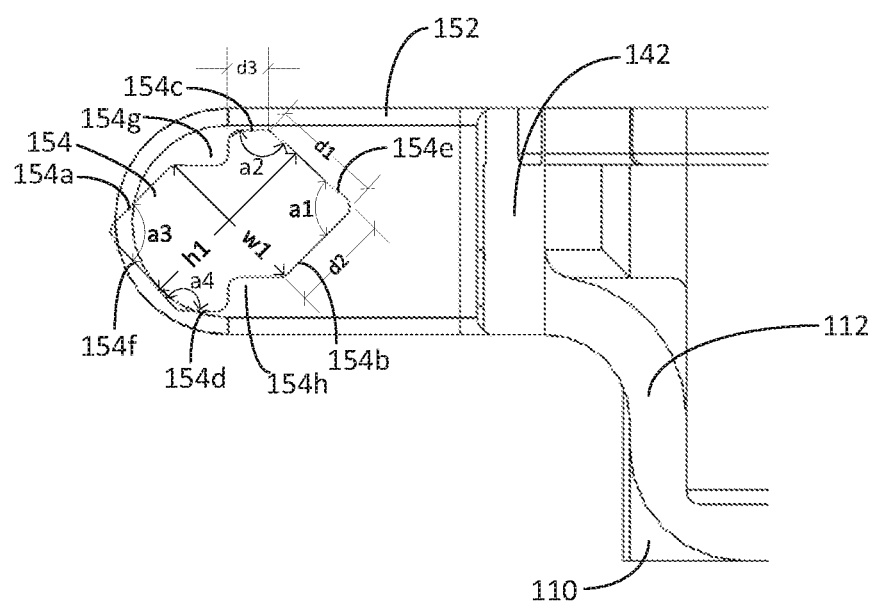
FIG. 28 is a cross-sectional view of the tray shown in FIG. 17, taken along the line 28-28 in FIG. 23.

As most easily seen at FIG. 28, the positioning member 154 has a general cross-sectional overall height h1 and a width w1. In the example shown, the height h1 is greater than the width w1. The positioning member 154 is also shown as being configured such that the exterior surfaces 154a/154b have a cross-sectional length d1, such that the exterior surfaces 154c/154d have a cross-sectional length d2, and such that the exterior surfaces 154e/154f have a cross-sectional length d3. In the example shown, length d1 is greater than length d2 while length d2 is greater than length d3. The positioning member is also configured such that the surface 154e is disposed at an angle a1 with respect to surface 154b, the surface 154e is disposed at an angle a2 with respect to surface 154c, the surface 154a is disposed at an angle a3 with respect to surface 154f, and such that the surface 154d is disposed at an angle a4 with respect to surface 154f. In the example shown, the angles a1, a2, a3, and a4 are all different from each other. For example, angles a2 and a4 are greater than angles a1 and a3. For example, angle a1 is shown as being less than angle a3 and angle a2 is shown as being less than angle a4, thereby causing surfaces 154e and 154f to converge or narrow as they approach surfaces 154a, 154c. With such a configuration, the surfaces 154e, 154f can be oriented to generally match the angle of the surfaces 182a of the walls 182, which diverge at a small angle, such that a more aligned configuration results when the tray 110 is rotated to the third indexing position shown at FIGS. 9 to 11. In some configurations, angles a1 and a3 can be equal to each other, such as both being 90 degrees, and angles a2 and a4 can be equal to each other, such as both being 135 degrees. With the disclosed configuration, the positioning member 154 has an asymmetrical cross-sectional shape and only has one axis of rotational symmetry. However, where the angles a1/a3 and a2/a are made equal to each other, the positioning member 154 will have an asymmetrical shape with two axes of rotational symmetry.

In one aspect, the corner defined at the intersection of surfaces 154a/154f is oriented in the same general direction as the ramped surfaces 146a of the hinge members 146. With this orientation, the tray 110 can be installed onto the groove plate 160 with little or no initial resistance between the positioning member 154 and walls 182 as contact between these components is delayed for as long as possible while the hinge members 146 are being inserted into the apertures 174.

Referring to FIGS. 5, 8, 11, and 29-35, the progressive operation and interaction between the positioning member 154 with respect to the walls 182 during rotation of the tray 110 is illustrated. It is noted that the walls 182 are not actually shown as being deflected at FIGS. 8, 11, and 29-35 for the purposes of illustration and such that the degree of otherwise occurring interference can be more easily visualized. A skilled person will readily understand that the walls 182 will deflect away from the positioning member 154 as a contact force between the parts generates. At FIGS. 33-35, example schematic deflected surfaces 182*a*' are illustrated to show the direction in which the surfaces 182*a* will deflect during rotation of the tray 110.

Figure 5:
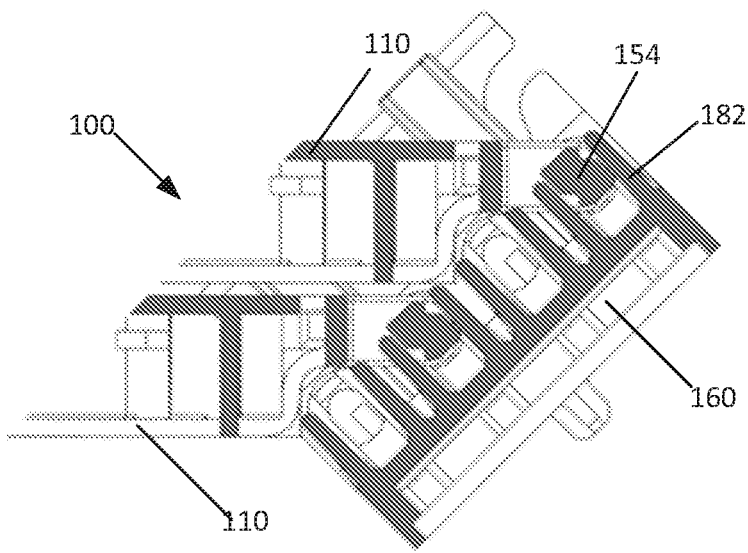
FIG. 5 is a longitudinal cross-section of the tray assembly shown in FIG. 3 at the location of a positioning arrangement.
Figure 6:
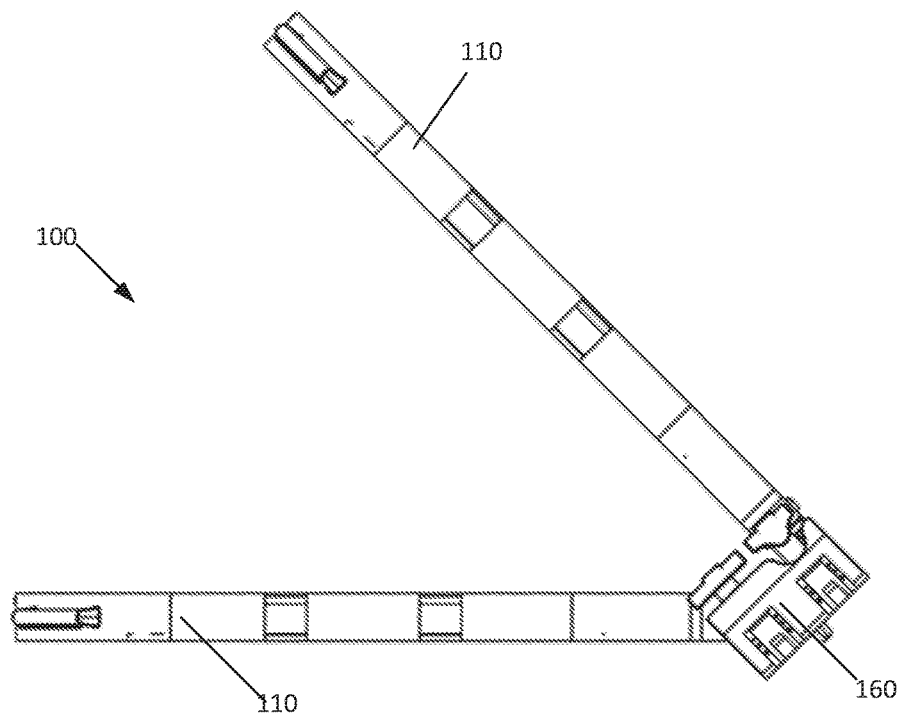
FIG. 6 is a side view of the tray assembly shown in FIG. 1, with the top tray in a second positon and the bottom tray in the first position.
Figure 7:
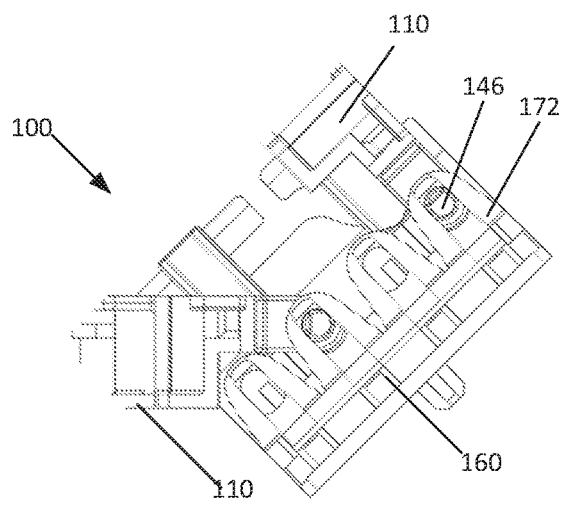
FIG. 7 is a longitudinal cross-section of the tray assembly shown in FIG. 6 at the location of the hinge arrangement.
Figure 8:
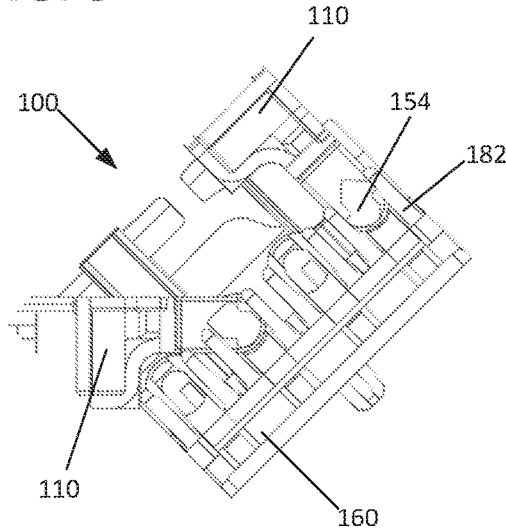
FIG. 8 is a longitudinal cross-section of the tray assembly shown in FIG. 6 at the location of the positioning arrangement.
Figure 29:
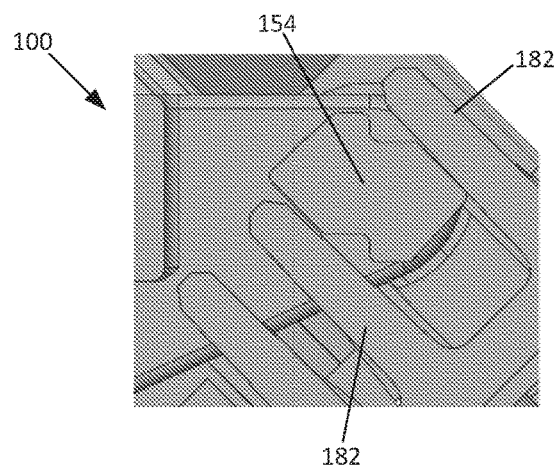
FIG. 29 is a schematic cross-sectional view of the tray assembly shown in FIG. 1, with the tray in a first position.

As most easily seen at FIGS. 5 and 29, the tray 110 is rotated into a first position in which the exterior surfaces 154*a*, 154*b* are not in contact, or are at most in minimal contact, with the interior surfaces 182*a* of the walls 182. In this first position, it can also be seen that the bottom of the tray 110 is supported by another wall 182 such that the tray is held in a horizontal position and will not rotate downwardly or in a counterclockwise direction, as shown on the page.

Figure 30:
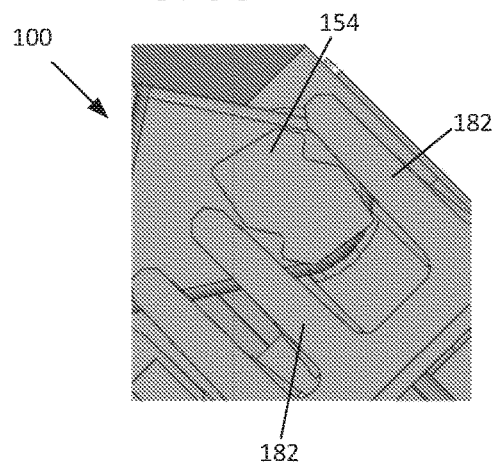
FIG. 30 is a schematic cross-sectional view of the tray assembly shown in FIG. 29, with the tray rotated to an opening angle of about 12 degrees with respect to the first position.
Figure 31:
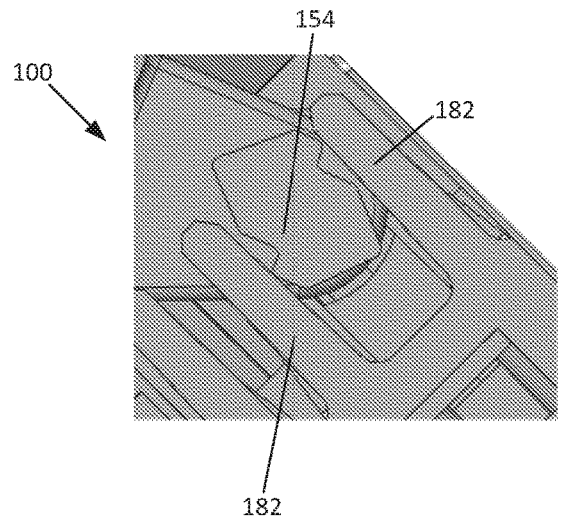
FIG. 31 is a schematic cross-sectional view of the tray assembly shown in FIG. 29, with the tray rotated to an opening angle of about 22 degrees with respect to the first position.
Figure 32:
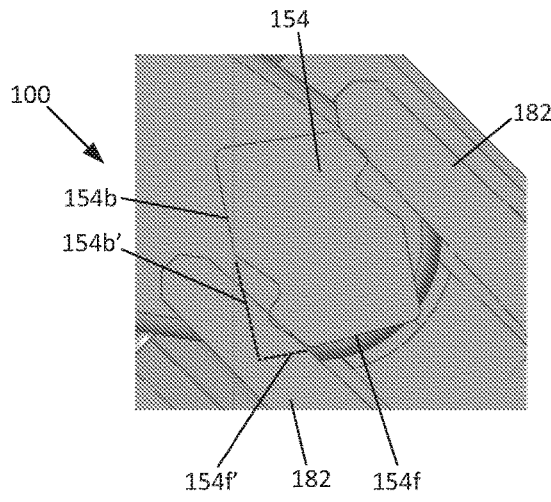
FIG. 32 is a schematic cross-sectional view of the tray assembly shown in FIG. 29, with the tray rotated to an opening angle of about 33 degrees with respect to the first position.
Figure 33:
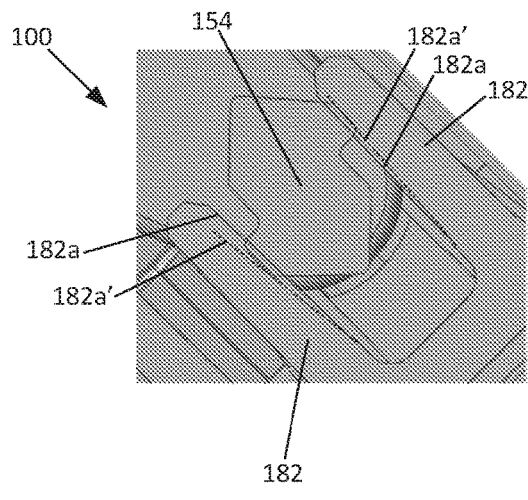
FIG. 33 is a schematic cross-sectional view of the tray assembly shown in FIG. 29, with the tray rotated to an opening angle of about 45 degrees with respect to the first position.

From the first position, the tray 110 is able to generally freely rotate in the clockwise or opening direction without a resisting force caused by the interaction between the positioning member 154 and the adjacent walls 182. By use of the term "generally freely rotate" it is meant that either no resistive force or only a minimal resistive force is generated between the positioning member 154 and walls 182, such as a force that is less than 25 percent of the maximum force generated between the positioning member 154 and walls 182 throughout the entire rotational range of the tray 110. As shown at FIGS. 30 to 32, the tray 110 can generally freely rotate through 12 degrees, 22 degrees, 33 degrees, and ultimately through about 45 degrees from the first position until contact occurs between the positioning member 154 and the adjacent walls 182 sufficient to create a resistance force from further rotation. In the position shown at FIG. 32 the corners formed by the intersection of surfaces 154*d*/154*f* and 154*c*/154*e* are first brought into contact against the surfaces 182*a*. As schematically illustrated at FIG. 32, without the presence of the recesses 154*g*/154*h* and chamfered or shorter surfaces 154*c*, 154*d*, the surfaces 154*b*/154*d* would project along lines 154*b*'/154*d*'. Thus, without these features, the tray 110 could not be freely rotated from the first position to the positions shown in FIGS. 30-32. Rather, a significant rotating force would start almost immediately when rotating away from the first position as the corner formed at 154*b*'/154*d*' would cause significant and increasing deflection of the walls 182 during rotation which. Such a condition would impede an operation in which the groove plate or frames 160 are designed to be rotatable from a first position in which the frame 160 is in a vertical position in which the walls 182 are vertically stacked to a second position in which the frame 160 is rotated into a canted or angled position, for example, the position shown at FIGS. 3 to 11.

Figure 34:
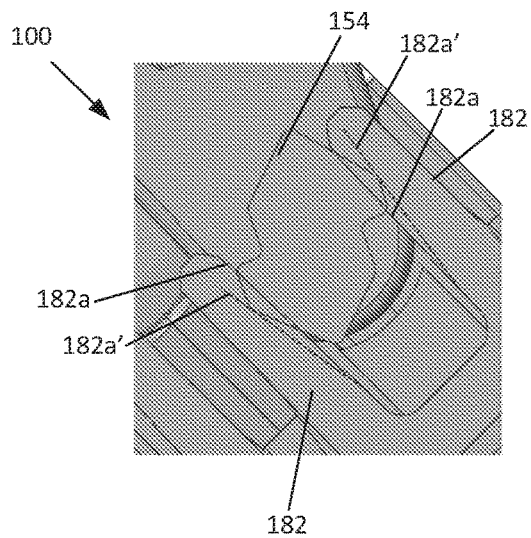
FIG. 34 is a schematic cross-sectional view of the tray assembly shown in FIG. 29, with the tray rotated to an opening angle of 70 degrees with respect to the first position.
Figure 35:
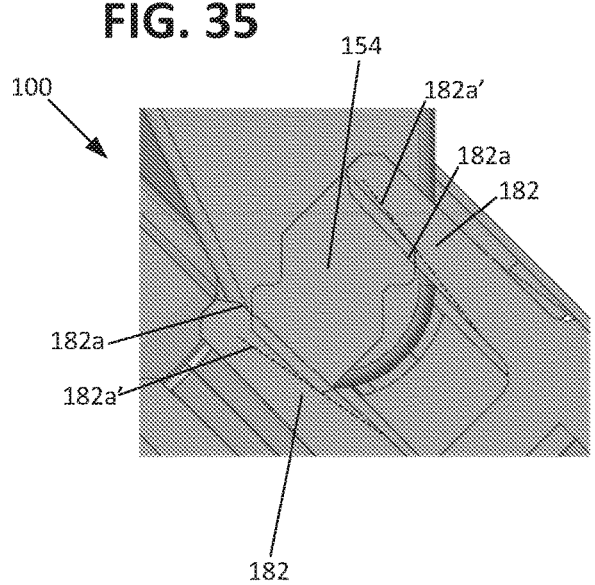
FIG. 35 is a schematic cross-sectional view of the tray assembly shown in FIG. 29, with the tray rotated to an opening angle of 90 degrees with respect to the first position.

As the tray 110 continues to rotate beyond the position shown at FIGS. 32, the tray 110 will rotate through a 60 degree angle, as shown at FIGS. 6-8 and 33, through an 80 degree angle, as shown at FIG. 34, with continued resistance caused by the interaction between the positioning member 154 and the walls 182. As the tray 110 is further rotated, the tray 110 will reach a fully open position at 90 degrees, as shown at FIGS. 9-11 and 35. In this position, the exterior surfaces 154*e*, 154*f* are brought into contact with the interior surfaces 182*a* to index or hold the tray 110 in the open position. At this position, the walls 182 will deflect back towards their resting position as the distance between the surfaces 154*e*, 154*f* is less than the distance to the corners defined by the intersection of surfaces 154*c*/154*e* and 154*d*/154*f*. Thus, an operator will receive tactile feedback that the open position has been reached as the resistance encountered between 45 and 90 degrees of rotation will rapidly decrease at 90 degrees of rotation. Additionally, as the tray 110 is rotated past the position shown at FIG. 34, the interacting forces between the positioning member 154 and walls 182 will draw the tray 110 into the open position shown at FIG. 35 as the corner passes through an "over center" position defined by the 154*c*/154*e* and 154*d*/154*f* corners passing by the surfaces 182*a*. In the open position, there is sufficient resistive force between the positioning member 154 and the walls 182 in both rotational directions such that the tray 110 is retained in the open position. As the corners formed by surfaces 154*b*/154*e* and 154*a*/154*f* are generally provided at a right angle and are not chamfered, the tray 110 is essentially prevented from opening beyond the open position, as an unusually high rotational force would be required to facilitate continued rotation of the tray 110. Although the positioning member 154 and the walls 182 are configured such that the angle at which resistance occurs is generally at 45 degrees and the angle at which the tray 110 is retained in an open position is generally at 90 degrees, other relative angles are possible.

In one aspect, the groove plate 160 is shown with four connection arrangement second parts 170 and four corresponding positioning arrangement second parts 180 such multiple trays can be supported by the groove plate 160. However, more or fewer second parts 170, 180 can be provided without departing from the concepts presented herein. For example, the groove plate can be provided with one, two, six, eight, ten, twelve, or more second parts 170, 180.

In the example shown, the connection arrangement first part 140 and the positioning arrangement first part 150 are integrally formed with the main body 112 of the tray 110. In some examples, the main body portion 112 and 140/150 of each tray 110 is unitarily formed as a single component. In some examples, the trays 110 and/or the groove plate 160 are formed from a polymeric material, such as an ABS polycarbonate material.

Figure 36:
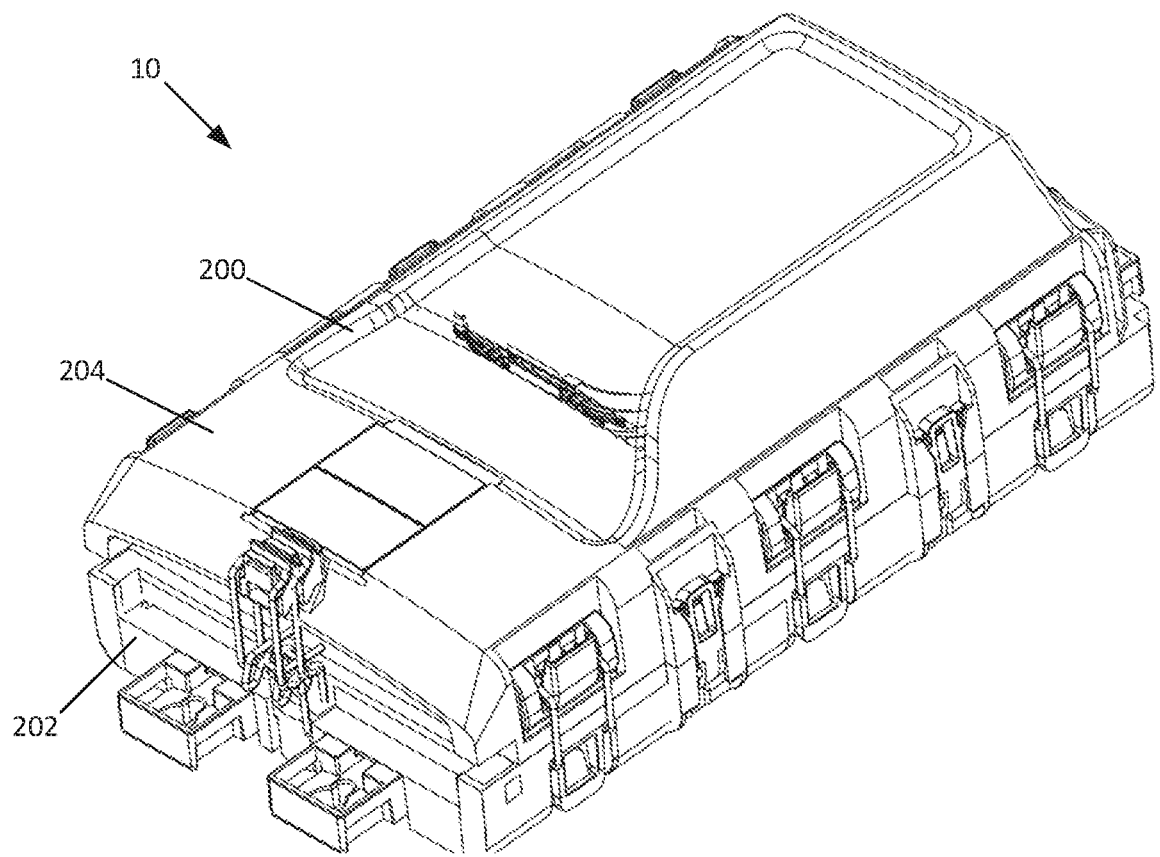
FIG. 36 is a perspective view of a telecommunications system having an enclosure housing a plurality of the tray assemblies shown in FIG. 1.
Figure 37:
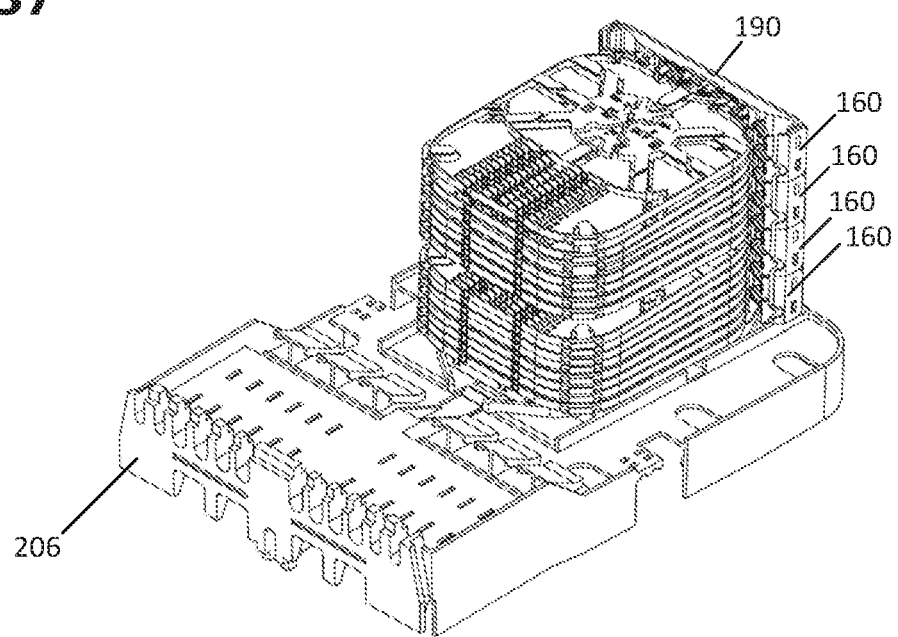
FIG. 37 is a perspective view of a stack of the tray assemblies shown in FIG. 1 arranged on a base for mounting within the enclosure of the telecommunications system shown at FIG. 36.
Figure 38:
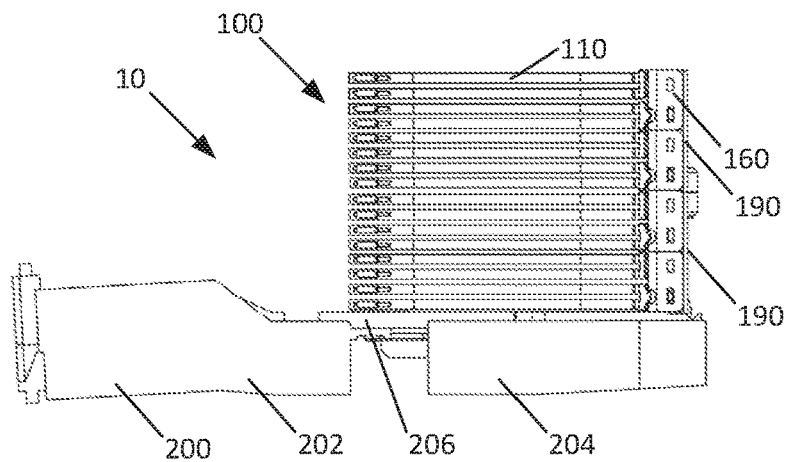
FIG. 38 is a side view of the telecommunications system shown in FIG. 36, with the stacked trays in a storage position.
Figure 39:
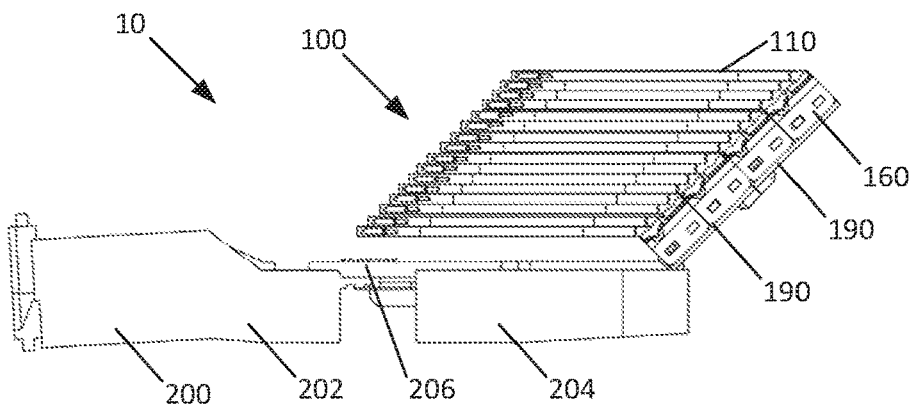
FIG. 39 is a side view of the telecommunications system shown in FIG. 36, with the stacked trays in an access position.
Figure 40:
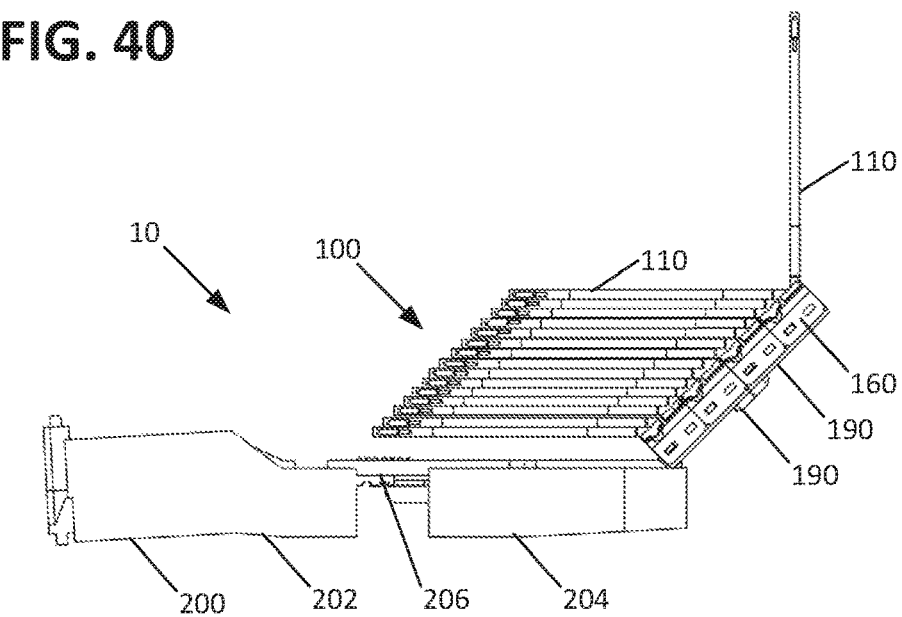
FIG. 40 is a side view of the telecommunications system shown in FIG. 36, with the stacked trays in an access position with the top tray being shown in a fully open position.

Referring to FIGS. 36-40, an example telecommunications system 10 housing a plurality of the tray assemblies 100 is shown. Some aspects of the telecommunications system 10 are shown and described in the U.S. 62/826,697 application. In one aspect, and as shown at FIG. 36, the telecommunications system includes an enclosure 200 with a base 202 and a cover 204 operable to close and open with respect to the base 202. As shown at FIG. 37, a base tray 206 is shown that is mountable to the enclosure base 202. The base tray 206 is configured to receive and retain a groove plate 160 in a manner such that the groove plate 160 is rotatable with respect to the base tray 206. An additional three groove plates 160 are stacked onto the bottom groove plate 160, wherein each groove plate 160 rotatably supports four trays 110. It is noted that the trays 110 shown at FIGS. 36-40 with a lower profile in comparison to the trays 110 shown in FIGS. 20-28 such that more trays can be mounted to a single groove plate 160. However, the trays 110 shown at FIGS. 20-28 can also be mounted within the system 10. As shown at FIG. 38, the stacked tray assemblies 100 are in a storage position in which the trays 110 and groove plates 160 are stacked directly above and below each other. As shown at FIG. 39, the bottom groove plate 160 has been rotated with respect to the base tray 206, such that the groove plates 160 are canted at an angle. In the example shown, the groove plates are rotated about 45 degrees from the storage position angle. This orientation is the same as that shown for the groove plate at FIGS. 1-11. FIG. 40 is the same as FIG. 39, but with the uppermost tray rotated to the open position shown at FIGS. 9-11 and 35. Due to the configuration of the groove plates 160 and trays 110, the tray assemblies 100 can be moved from the storage positon shown in FIG. 38 to the access position shown in FIG. 39 with little or no resistance from the positioning members 154 and walls 182 as the trays 110 are able to generally freely rotate with respect to their associated groove plates 160 through this angle.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. A telecommunications tray assembly, comprising:
 a) a groove plate;
 b) a telecommunications tray;
 c) a connection arrangement rotatably connecting the tray to the groove plate; and
 d) a positioning arrangement enabling the telecommunications tray to be rotated, with respect to the groove plate, between a first rotational position and a second rotational position, wherein the positioning arrangement includes a positioning member of the telecommunications tray, an exterior of the positioning member including a pair of opposing exterior recessed surfaces recessed toward a pivot axis of the telecommunications tray, wherein the positioning arrangement:
  i) provides resistance to rotation of the telecommunications tray between the first and second rotational positions; and
  ii) provides a resistive force to retain the telecommunications tray in the second rotational position.

2. The telecommunications tray assembly of claim 1, wherein the second rotational position is 45 degrees relative to the first rotational position.

3. The telecommunications tray assembly of claim 1, wherein the positioning member is located on the telecommunications tray and is received in an open channel located on the groove plate.

4. The telecommunications tray assembly of claim 3, wherein the positioning member includes three pairs of opposing exterior surfaces.

5. The telecommunications tray assembly of claim 1, wherein a hinge member is associated with one of the telecommunications tray and the groove plate and an aperture receiving the hinge member is on the other of the telecommunications tray and the groove plate.

6. The telecommunications tray assembly of claim 5, wherein the hinge member is positioned on a first support arm and the aperture is positioned on a second support arm.

7. The telecommunications tray assembly of claim 6, wherein one or both of the first and second support arms is deflectable.

8. The telecommunications tray of claim 6, wherein the hinge member and the first arm includes a pair of hinge members and a pair of first support arms and wherein the aperture and the second support arm includes a pair of apertures and a pair of second support arms.

9. A telecommunications tray assembly, comprising:
 a) a groove plate;
 b) a telecommunications tray;
 c) a connection arrangement rotatably connecting the tray to the groove plate; and
 d) a positioning arrangement enabling the telecommunications tray to be rotated, with respect to the groove plate, between a first rotational position, a second rotational position, and a third rotational position, wherein the positioning arrangement includes a positioning member of the telecommunications tray, the positioning member having two or fewer axes of rotational symmetry, wherein an exterior of the positioning member includes a pair of opposing exterior recessed surfaces recessed toward a pivot axis of the telecommunications tray, wherein the positioning arrangement:
  i) allows the telecommunications trays to generally freely rotate between the first and second rotational positions;
  ii) provides resistance to rotation of the telecommunications tray between the second and third rotational positions; and
  iii) provides a resistive force to retain the telecommunications tray in the third rotational position.

10. The telecommunications tray assembly of claim 9, wherein the positioning member has a single axis of rotational symmetry.

11. The telecommunications tray assembly of claim 9, wherein the positioning member is located on the telecommunications tray received in an open channel located on the groove plate.

12. The telecommunications tray assembly of claim 9, wherein the positioning member includes three pairs of opposing exterior surfaces.

13. The telecommunications tray assembly of claim 12, wherein at least one of the three pairs of opposing exterior surfaces has a different cross-sectional length than a cross-sectional length of another of the three pairs of opposing exterior surfaces.

14. The telecommunications tray assembly of claim 12, wherein each of the three pairs of opposing exterior surfaces has a different cross-sectional length than a cross-sectional length of the other two pairs of opposing exterior surfaces.

15. The telecommunications tray assembly of claim 9, wherein the positioning member has a cross-sectional height and a cross-sectional width, and wherein the cross-sectional height is unequal to the cross-sectional width.

16. A telecommunications tray assembly, comprising:
 a) a groove plate;
 b) a telecommunications tray; and
 c) a connection arrangement rotatably connecting the tray to the groove plate, the connection arrangement including a positioning member of the telecommunications tray, an exterior of the positioning member including a pair of opposing exterior recessed surfaces recessed toward a pivot axis of the telecommunications tray, the connection arrangement further including a pair of arms of the groove plate defining apertures receiving a pair of hinge members of the telecommunications tray, wherein the apertures have an elongate cross-sectional shape and the pair of hinge members have a circular cross-sectional shape, and wherein the hinge members are positioned at opposite ends of the positioning member.

17. The telecommunications tray assembly of claim 16, further including at least one support member slidably engaged with at least one channel, wherein contact between the at least one channel and the at least one support member forces the pair of hinge members to abut against an inner distal surface of the apertures.

18. The telecommunications tray assembly of claim 16, wherein the apertures have a width generally equal to a diameter of the hinge members and wherein the apertures have a length that is greater than the diameter of the hinge members.

* * * * *

UNITED STATES PATENT AND TRADEMARK OFFICE
CERTIFICATE OF CORRECTION

PATENT NO. : 12,210,203 B2
APPLICATION NO. : 17/600020
DATED : January 28, 2025
INVENTOR(S) : Bart Mattie Claessens Page 1 of 1

It is certified that error appears in the above-identified patent and that said Letters Patent is hereby corrected as shown below:

In the Claims

Column 11, Line 65, Claim 8: "tray of claim" should read --tray assembly of claim--

Signed and Sealed this
Eighth Day of April, 2025

Coke Morgan Stewart
*Acting Director of the United States Patent and Trademark Office*